(12) United States Patent
Mouhanna et al.

(10) Patent No.: US 7,523,172 B2
(45) Date of Patent: Apr. 21, 2009

(54) NETWORK AND METHOD FOR IMPLEMENTING NETWORK PLATFORM SERVICES FOR A COMPUTING DEVICE

(75) Inventors: Joseph H. Mouhanna, Woodinville, WA (US); Mark T. Jeffrey, Wokingham (GB)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 11/186,258

(22) Filed: Jul. 20, 2005

(65) Prior Publication Data

US 2005/0256952 A1 Nov. 17, 2005

Related U.S. Application Data

(62) Division of application No. 09/711,289, filed on Nov. 13, 2000, now Pat. No. 6,976,066.

(60) Provisional application No. 60/206,180, filed on May 22, 2000.

(51) Int. Cl.
*G06F 15/16* (2006.01)
*G06F 15/173* (2006.01)

(52) U.S. Cl. ............... 709/217; 709/221; 709/244

(58) Field of Classification Search ............... 709/217, 709/227, 228, 220, 218; 717/177, 176
See application file for complete search history.

(56) References Cited

U.S. PATENT DOCUMENTS

| | | | | |
|---|---|---|---|---|
| 5,548,726 A * | 8/1996 | Pettus | ............... | 709/221 |
| 5,710,884 A | 1/1998 | Dedrick | ............... | 395/200.47 |
| 5,742,829 A * | 4/1998 | Davis et al. | ............... | 717/178 |
| 5,802,518 A | 9/1998 | Karaev et al. | ............... | 707/9 |
| 6,074,434 A * | 6/2000 | Cole et al. | ............... | 717/173 |
| 6,101,537 A * | 8/2000 | Edelstein et al. | ............... | 709/219 |
| 6,108,789 A | 8/2000 | Dancs et al. | ............... | 713/201 |
| 6,151,643 A | 11/2000 | Cheng et al. | ............... | 710/36 |
| 6,185,619 B1 * | 2/2001 | Joffe et al. | ............... | 709/229 |
| 6,282,712 B1 * | 8/2001 | Davis et al. | ............... | 717/170 |
| 6,286,047 B1 * | 9/2001 | Ramanathan et al. | ............... | 709/224 |

(Continued)

*Primary Examiner*—Kevin Bates
(74) *Attorney, Agent, or Firm*—Woodcock Washburn LLP

(57) ABSTRACT

A network provides computer services to users and has a centralized data center (CDC) and regional data centers (RDCs) coupled to the CDC. Each RDC is coupled to a plurality of users and maintains for each associated user back up storage. Each user has a user machine with user data stored thereon, and such user data is automatically mirrored to the associated back up storage on the RDC. Each RDC maintains for each associated user a user profile corresponding to the user, and each user and each RDC has a physical location. A user newly couples to the network by contacting the CDC at a network address thereof and receiving from the CDC a network address of an RDC based at least in part on the location of the user. The RDC of the received network address maintains the user profile for the user, and the location of such RDC is expected to be relatively close to the location of the user as compared with the location of all other RDCs. Once coupled to the network, the user receives from the RDC a list of servers to use for services provided by the network for the user. The list of servers is obtained from the user profile for the user and comprises a list of corresponding network addresses. An application at a first network location may issue a command to a client at a second network location.

12 Claims, 17 Drawing Sheets

U.S. PATENT DOCUMENTS

| | | |
|---|---|---|
| 6,286,049 B1 | 9/2001 | Rajakarunanayake et al. ............... 709/227 |
| 6,297,819 B1 | 10/2001 | Furst .......................... 345/329 |
| 6,304,913 B1 * | 10/2001 | Rune .......................... 709/241 |
| 6,343,287 B1 * | 1/2002 | Kumar et al. .................... 707/4 |
| 6,347,331 B1 * | 2/2002 | Dutcher et al. ............... 709/203 |
| 6,360,255 B1 * | 3/2002 | McCormack et al. ....... 709/221 |
| 6,370,571 B1 | 4/2002 | Medin, Jr. .................... 709/218 |
| 6,397,219 B2 * | 5/2002 | Mills ............................ 707/10 |
| 6,578,066 B1 | 6/2003 | Logan et al. ................. 709/105 |
| 6,606,654 B1 * | 8/2003 | Borman et al. .............. 709/219 |
| 6,651,095 B2 * | 11/2003 | Barlock et al. .............. 709/223 |
| 6,714,992 B1 | 3/2004 | Kanojia et al. .............. 709/321 |
| 6,845,396 B1 | 1/2005 | Kanojia et al. .............. 709/224 |
| 7,383,299 B1 * | 6/2008 | Hailpern et al. ............. 709/203 |
| 2002/0013827 A1 * | 1/2002 | Edstrom et al. ............. 709/219 |
| 2002/0095488 A1 * | 7/2002 | Primak ....................... 709/223 |
| 2003/0093479 A1 * | 5/2003 | Mellen-Garnett et al. ... 709/205 |

\* cited by examiner

NETWORK AND METHOD FOR IMPLEMENTING NETWORK PLATFORM SERVICES FOR A COMPUTING DEVICE

CROSS-REFERENCE TO RELATED APPLICATION

This application is a divisional of U.S. patent application Ser. No. 09/711,289, filed on Nov. 13, 2000, now U.S. Pat. No. 6,976,066 which in turn claims the benefit of U.S. Provisional Application No. 60/206,180, filed May 22, 2000 and entitled "WINTONE NETWORK".

TECHNICAL FIELD

The present invention relates to a network and a method that supports a computer device in such a manner that the network can provide network platform services to the computer device. More specifically, the present invention relates to such a network and method wherein the network performs most tasks necessary to distribute and update software on the computing device, to back up data on the computing device, and generally to make available data and software on the computing device, all in a manner that is substantially transparent to a user of the computing device. Accordingly, such user need not be computer savvy or literate except perhaps to answer simple questions.

BACKGROUND OF THE INVENTION

In recent years, a major effort has been undertaken in connection with a typical personal computer (PC) to simplify the interaction between the PC and a user thereof. Accordingly, the use of a typical PC is now within the grasp of many more people, and consequently many more PCs are now in use. A major problem has arisen in connection with the typical PC, though, in that in connection with the effort to simplify the interaction between the PC and the user thereof, the PC itself has become vastly more complex.

Typically, such a complex PC now has a graphically based operating system such as the WINDOWS operating system as designed and marketed by MICROSOFT Corporation of Redmond Wash., and may have several applications for use in connection with such operating system, a modem for coupling to an external communications system, service provider software for accessing an Internet service provider by way of the modem, a browser for browsing the Internet as accessed by way of the Internet service provider, an email application for sending and receiving email by way of the Internet service provider, printer software for sending data to a printer, scanner software for receiving scanned data from a scanner, facsimile software for sending and receiving facsimiles by way of the modem, and the like.

While the aforementioned complex PC often works well, innumerable examples abound of ways that the PC can develop operational issues including software conflicts, corrupted files, hardware breakdowns, memory conflicts, driver errors, processor lock-ups, and the like. Quite simply, grasping and correcting such issues is beyond the ken of many PC users. This is oftentimes true even for so-called sophisticated or knowledgeable PC users. While there are manuals, help desks, and other aids that are available for assisting the PC user in correcting such issues, it nevertheless often happens that such PC user in facing such issues quickly becomes frustrated.

Accordingly, a need exists for a better computing experience wherein such operational issues are minimized if not eliminated. In an effort to satisfy such need, the present invention offers a network to which the user's PC is connected, wherein the network acts as a platform for delivering applications to the PC, for maintaining the applications on the PC, for backing up user data from the PC, for diagnosing PC issues, and the like. The broad goal of the present invention is to deliver the aforementioned better computer experience to a PC user by intelligently leveraging the speed and constant connection benefits that broadband access solutions can deliver. Key attributes associated with the network of the present invention include:

1. Users do not need to 'dial up'. They can always be connected to the network and the Internet.
2. Users enjoy high bandwidth, bi-directional communications of at least an order of magnitude faster than what is possible with a 56k modem.
3. Users have a direct relationship with software vendors for trials/upgrades/purchases, product support, information services, and device management.
4. Network services offer protection from complexity, loss of information, viruses, accidents, and obsolescence.
5. Network functionality provides a simple PC experience free of complexities inherent in a locally based computing device.
6. Network functionality reduces PC design and support costs.
7. A networked PC become an essential part of a home or office even for those who have no use for traditional PC productivity applications.
8. The network works with whatever broadband solution (cable, ADSL, satellite, etc.) the customer uses.

As should be appreciated, the constant connection physical link between the network and the PC in turn spawns the opportunity to form a far more intimate, direct, and constant connection with the PC user and to simultaneously achieve much higher levels of operational efficiency in such key areas as product distribution, support, and sales and marketing. Such achieved efficiencies may in fact justify that access to the network be extended freely to all PC users, at least in some circumstances.

SUMMARY OF THE INVENTION

In the present invention, a network provides computer services to users and has a centralized data center (CDC) and a plurality of regional data centers (RDCs) operatively coupled to the CDC. Each RDC is operatively coupled to a plurality of users by way of a communications network, and maintains for each associated user a back up storage area. Each user has an associated user machine with user data stored thereon, and the user data stored on the associated machine is automatically mirrored to the associated back up storage area on the RDC.

Each RDC maintains for each associated user a user profile corresponding to the user, and each user has a physical location and each RDC having a physical location. A user newly couples to the network by receiving a network address of the CDC, contacting the CDC at the network address thereof, requesting from the CDC a network address of an RDC based at least in part on the location of the user; and receiving a network address of an RDC from the CDC. The RDC of the received network address maintains the user profile for the user, and the location of such RDC is expected to be relatively close to the location of the user as compared with the location of all other RDCs.

Once coupled to the network, the user contacts the RDC, requests from the RDC a list of servers to use for services provided by the network for the user, and receives the list of servers. The list of servers is obtained from the user profile for the user and comprises a list of corresponding network addresses.

To distribute a user-based product from a vendor, where the product is available for purchase by each user and for installation on an associated user machine, the product is received from the vendor at an RDC, is pushed by the RDC to the CDC, and is propagated by the CDC to all of the RDCS. The product is then advertised by each RDC to at least some associated users. A user interested in the advertised product contacts the vendor to purchase the product therefrom and receives an authorization from the vendor in response thereto. The associated RDC receives the authorization from the user, downloads the product to the user for installation on the associated user machine, and updates the user profile for the user to reflect the installation.

An application at a first network location may issue a command to a client at a second network location.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
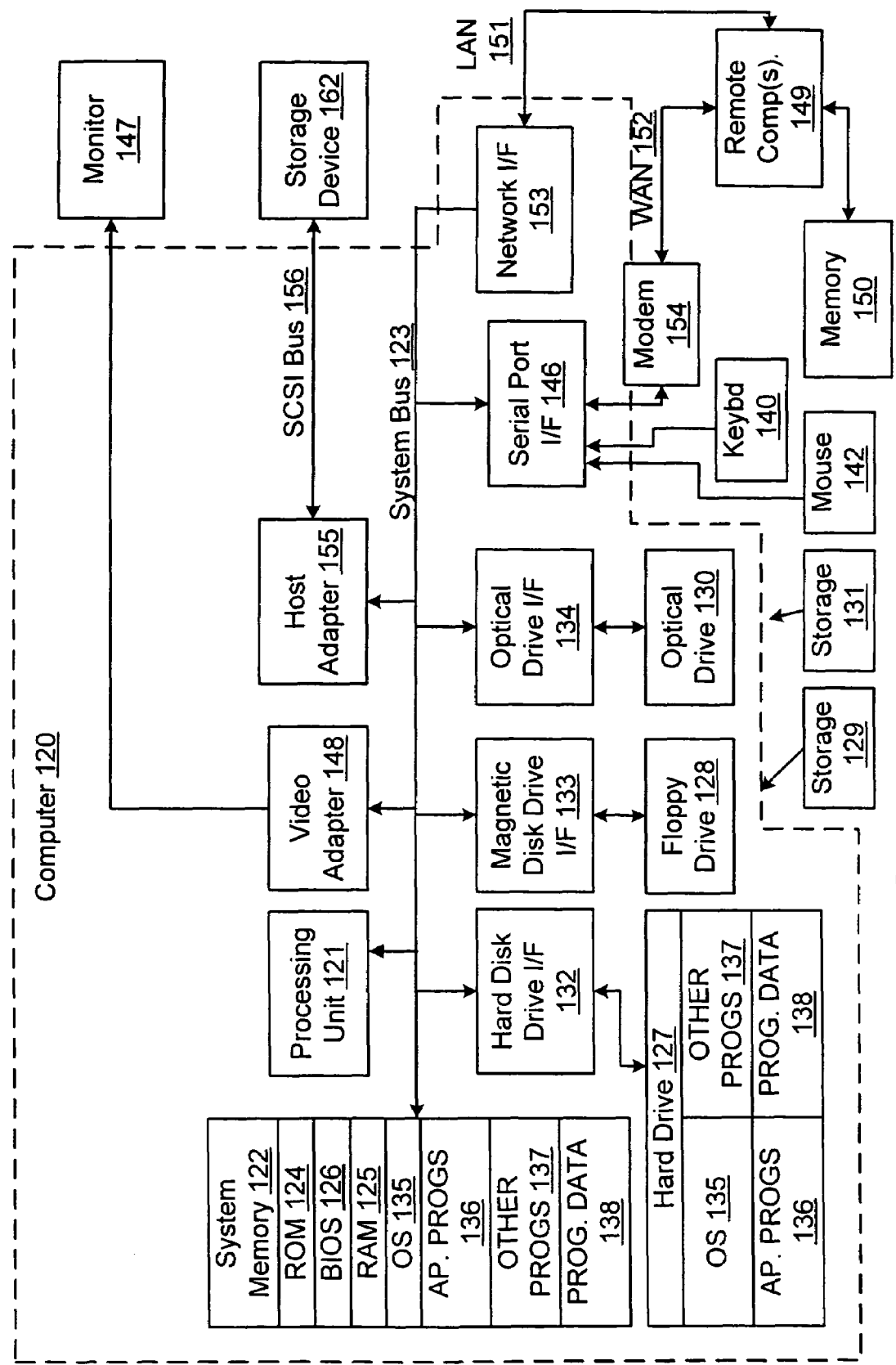
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Terminology

The following terminology, as used herein, may generally be interpreted to be defined as noted:

| | |
|---|---|
| ADSL | Asymmetric Digital Subscriber Line, a broadband access connection over existing telephone wires |
| Cableco | Cable TV company offering local network service |
| CAP | Competitive Access Provider (company other than the ILEC offering local-loop service) |
| CCC | Central Content Center - one of a number that provide applications, components, and other content to RDCs, for the Network provider to offer to its clients |
| CDC | Central Data Center - central administration and headquarters of the network service |
| CLEC | Competitive Local Exchange Carrier (unregulated Telco) offering local service where there is an existing ILEC |
| Client | Any network-compliant device and/or the User using same |
| DSL | Digital Subscriber Line - Various technologies for carrying mid to high bandwidth along conventional telephone wires. ADSL is one such technology |
| DSLAM | DSL Access Multiplexer - Aggregates a number of DSL lines onto a single ATM link for back haul into the network |
| ILEC | Incumbent Local Exchange Carrier (regulated part of Telco) |

-continued

| | |
|---|---|
| ISP | Internet Service Provider |
| LDC | Local Data Center - an installation of Network servers directly connected to/close to the broadband access network, used for distribution of software and files to client machines at high speed |
| Netop | Network Operator - typically a Telco or Cableco, but can also include ISPs, CAPs, and the like |
| NPC | Network Proxy Center - caching service located at the LDC |
| NSP | Network Service Provider |
| RDC | Regional Data Center - administrative hub for a large number of users |
| Subscriber | Network account holder. More than one User and more than one Client may use the subscriber account |
| Telco | Telephone Company offering local network service |
| User | A human being who makes use of a Network account. |

Referring to the drawings in details, the network platform service of the present invention may be described in terms of both the service and network architecture thereof. The service architecture specifies the distribution of functions in the different servers that provide the network services. The network architecture specifies the network infrastructure and the protocols required to support the service architecture. Since the locations of different types of servers have direct ramifications to the networking requirements of the network platform service of the present invention, the service architecture and the network architecture designs are interdependent. A description of both the service and network architectures of the network of the present invention, as well as an end-to-end client connection procedure, is as follows:

Service Architecture

Figure 2:
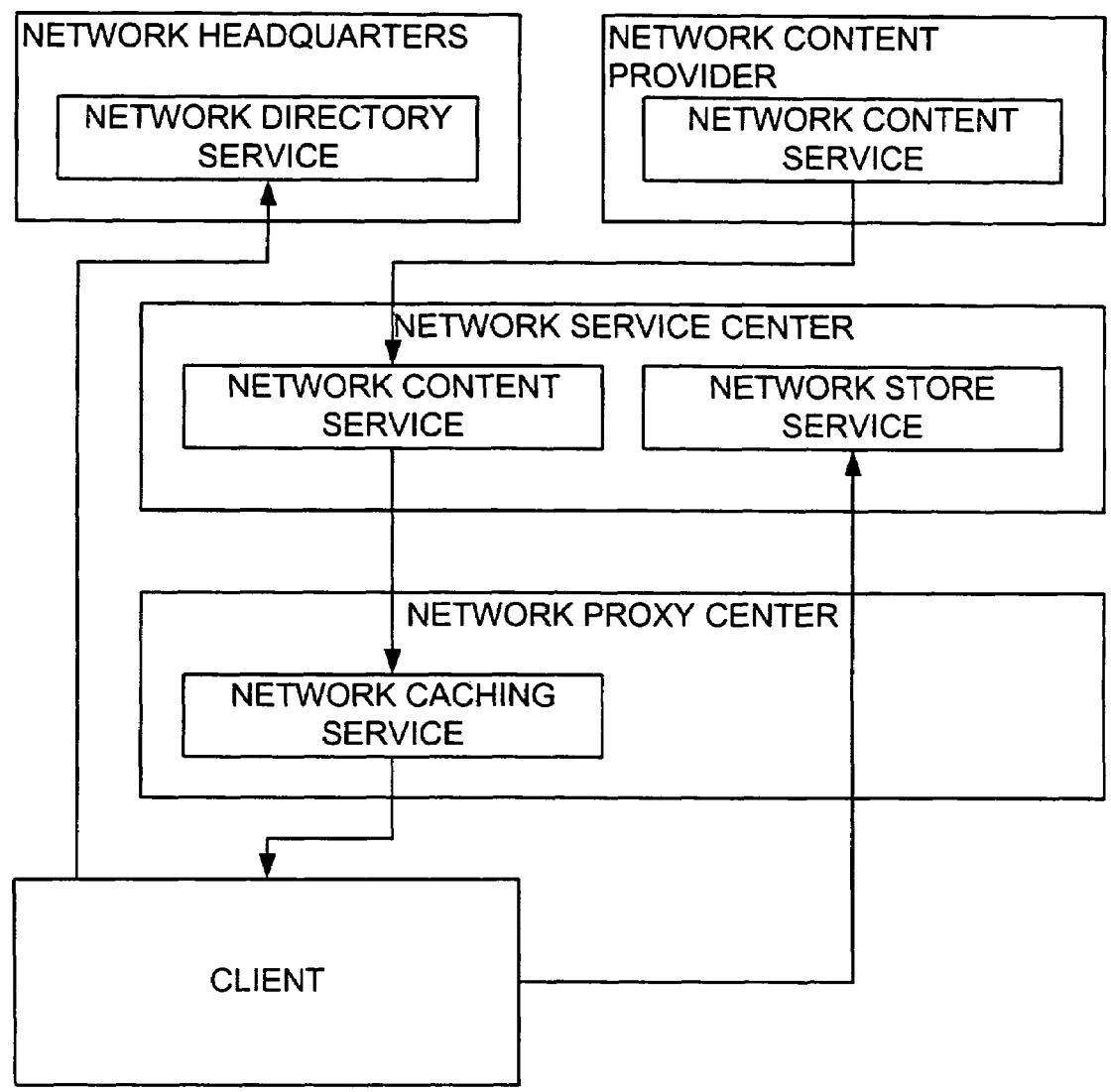
FIG. 2 is a block diagram showing the network service components and centers of the network in accordance with one embodiment of the present invention, and represents a logical view of the functions provided by the network.

The service architecture specifies a set of service components and their relationships. The service components can be implemented in a shared server, in a unique server for each component or distributed across multiple servers for each component. These service components are grouped into certain locations (i.e., centers) to optimize networking and performance requirements. The network service components and centers are shown in FIG. 2, which presents a logical view of the functions provided by the network. Instances of the network service can then be defined by assigning such elements to physical locations.

Network Headquarters

The Network Headquarters function provides the central, national or even global coordination required to operate the service centrally, nationally, or globally, as the case may be. The Network Headquarters function hosts the national Network Directory service. The Network Directory service refers Network subscribers to the appropriate Network Service Center or Network Proxy Center.

Network Content Provider

The Network Content Provider supplies applications, operating systems, updates, and other components that a user/client can install at an associated computing device by way of the network service. The central/ national/global Network Content Provider supplies content to Network Content services across the network. Content Providers can be any software vendors, and can be freely selected by the Network Service Provider in composing their service package(s). Content includes applications, components, media items, and web-based content, plus other items. Content may be bought, licensed, rented, or otherwise traded as required. Any compliant vendor can establish a Content Provider Service and freely market its offerings to all of the Network Service Providers.

Network Service Center

The Network Service Center hosts services for the clients, including the management of client PCs (where applicable), deployment of supplied content, remote back up storage for user's documents, and the like. The Network Service Center hosts the Network Store and Network Content service. The clients can communicate directly with the Network Service Center or indirectly through the Network Proxy Center below.

Network Proxy Center

The Network Proxy Center provides local broadband access to distributed shared resources such as application installation files. This allows clients to access such data from a relatively local source at full broadband rates. No user-specific data is kept here, to control management overhead. The Network Proxy Center hosts the Network spooling and caching services. The client can obtain much of the network service through the Network Proxy Center, if available, without going directly to the Network Service Center. The Network Proxy Center reduces the bandwidth requirements for connecting to the Network Service Center.

Network Directory Service

The Network Directory Service is responsible for referring a Network subscriber to the appropriate Network Service Center or Network Proxy Center when it first requests Network service. It also provides various low-level services such as clock synchronization and the logging of events and statistics. Such service also may include functions to support clients roaming among Network providers.

Network Content Service

The Network Content service is responsible for distributing application programs and updates to operating systems and applications to the clients. Depending on the location of the Network Content servers, they can provide both local and central/national/global content. Each Network Service provider is at liberty to obtain content from any combination of qualified providers. The Network Headquarters does not itself provide content to the Network Service Centers.

Network Store Service

The Network Store service is responsible for storing user data that is central to the Network service. Such user data include user applications data ("My Documents" folders), mail boxes, system configurations and application settings. Due to the large storage and high reliability requirements for the Network Store service, it should be implemented using a service provider that can satisfy such large storage and high reliability requirements. In addition, the Network Store service may be backed up locally using tapes or the like for economic reasons.

Network Caching Service

In parallel to the Network Spooling service, the Network Caching service is an intermediate or (proxy) service between the Network Content service and the client to reduce the bandwidth requirements in the downstream direction. The bandwidth requirement is reduced by (similar to multicast) sending a single copy from the Network Content server to the Network Caching service for local replication, instead of one per user from the Network Content server.

Network Architecture

The Network Architecture consists of several interconnected elements, including: client machines attached to broadband access networks; data centers for the storage and management of components and services; network infrastructure to carry information between these locations; and protocols to instantiate, configure, control, and manage the service. The network architecture distributes the service functions across a hierarchical network of physically located data centers. The network of the present invention may employ combinations of private and public data networks to transport data between clients and servers.

The network architecture of the present invention is based on network service requirements including: minimum (deployment and operational) cost per user; adequate bandwidth for user data backup and application and operating system distribution; high performance for system recovery; central, national, or global coverage; graceful scalability from 100s to millions of subscribers; service reselling; minimized total cost of ownership of network devices; security that is transparent to users yet projects confidence to users for transaction and data storage; and residential broadband access networks such as cable modem or ADSL modem networks. Similarly, the network architecture is based on customer requirements including: plug-and-play network installation; seamless operation; national coverage; no or minimal manual configuration; high performance for system recovery; low total cost of ownership; low complexity (i.e., easier than owning a consumer electronics device); and security in transactions and confidentiality of data transfer and backup.

The servers providing the various service components are physically located at the various data centers. There are three levels of data centers in the network architecture: central/national/global, regional, and local. For example, there may be one (or more) central data centers (CDCs) for the United States, with one or more Central Content Centers (CCCs) for each participating software vendor. Likewise, there are multiple regional data centers (RDCs) across the United States. Each network operator hosts one or more regional data centers. Each regional data center can in turn support multiple local data centers (LDCs).

Figure 3:
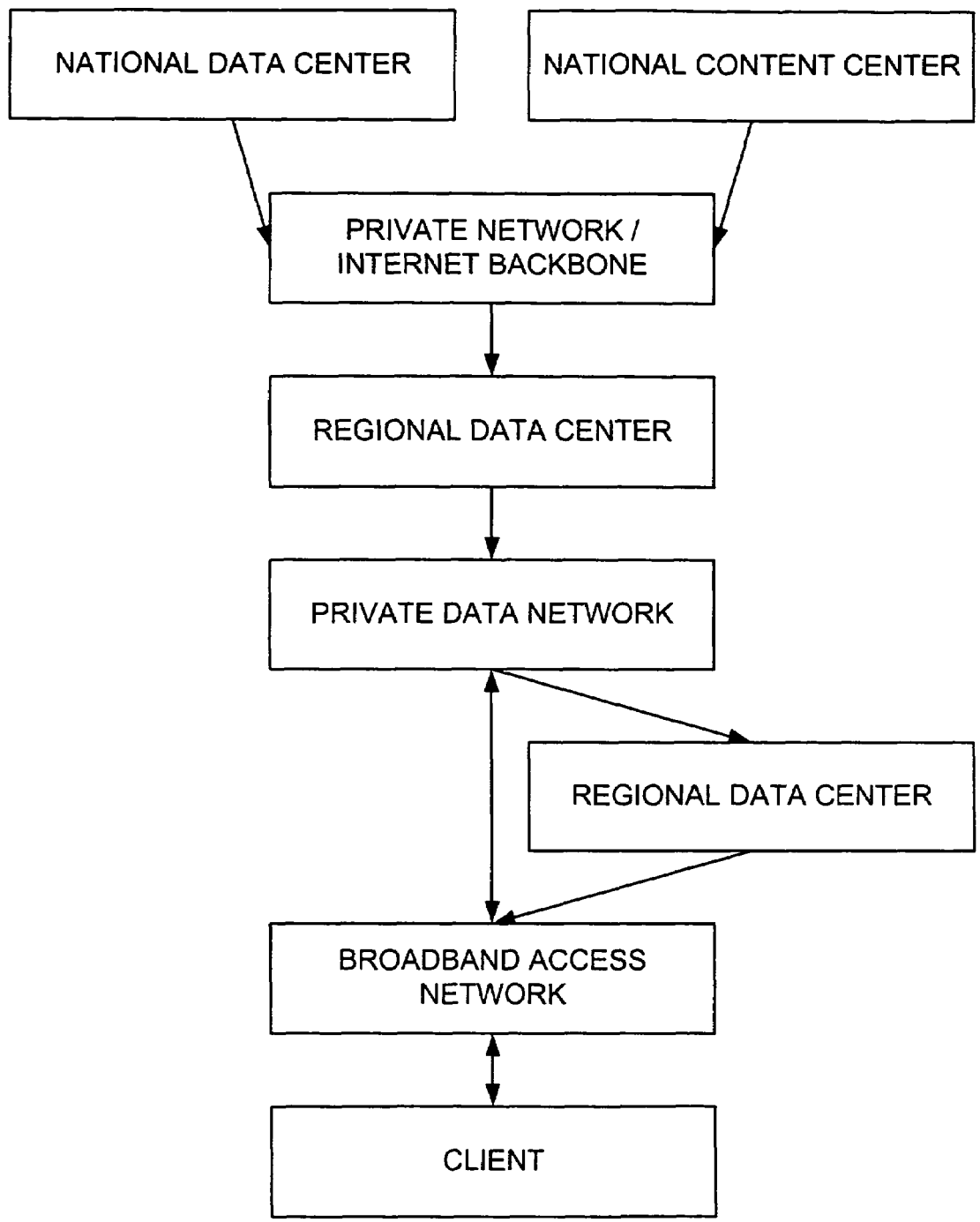
FIG. 3 is a block diagram showing the network data centers of the network in accordance with one embodiment of the present invention, and represents a physical view of the relationships between the data centers.

FIG. 3 shows the relationship of such data centers. Note that conventional Internet services such as web access, Mail, News, and so forth do not generally travel over the private data network of the present invention. There may be exceptions to this, for example if Mail is included as a service within the Network umbrella, but in general such traffic is outside the scope of network provisioning.

Central Data Center (CDC)

The Central Data Center (CDC) supports the Network Headquarters functions, and may for example be run by a software provider or a Telco. The CDC may also include Network Content Provider functions in support of certain software products to RDCs and LDCs. The CDC is responsible for the back-end administrative support of the Network platform service. Such CDC hosts the Network Headquarters and the Network Service Center functional entities described above. If there is no RDC or LDC run by a local network operator, the Network Service Center functional entity can be located at the CDC. Obviously, there is bandwidth cost and performance issues associated with hosting the Network Service centrally at the CDC, however, this provides a fast track to enable Network service. The connectivity of the client to the CDC can be through the Internet or a private backbone service, depending on the cost and performance tradeoff.

Central Content Center (CCC)

The Central Content Center (CCC) may be owned and run by one or more third party software vendors, and includes Network Content Provider functions for distribution of certain software products to RDCs and LDCs. The physical CCC supports one or more of the logical Network Content Provider functional entities. Each qualified software vendor establishes one or more Central Content Centers from where the Network Service Centers can obtain content as needed. The interface between the CCC and RDC is pre-defined to establish criteria for software to qualify for inclusion in the system.

The CDC needs to connect to: all the RDCs; the subset of LDCs not served by any RDCs; and the subset of clients that have no local RDC or LDCs. There are two approaches to provide all the CDC connectivity: Internet and private data networks. Using the Internet has the advantage of lower cost. This is not only because the access charge should be lower than private data networks, but also because existing Internet infrastructure can be leveraged, especially if the expected traffic pattern asymmetry of the network (high upstream load, low downstream load) complements that of the Internet infrastructure (low upstream load, high downstream load). Also, since the network service does not require much quality of service support, the Internet backbone performance may be sufficient for expected network needs. On the other hand, private data networks are often less expensive than using the Internet between fixed known points and ensure known levels of quality, and may comprise the use of Frame Relay, SMDS, or other transport services.

Regional Data Center (RDC)

The Regional Data Centers (RDCs) support the Network Service Center functions, and may be owned and run by the owner of the Central Data Center or a local network service provider such as a Telco. Each RDC also includes Network Proxy Center functions for clients who are geographically close to the RDC, thereby in effect acting as an LDC with regard to such Network Proxy Center functions.

As the Network service platform is deployed with local network operators in each region, RDCs are constructed to host Network Service Center functional entities. Since the RDC will perform local backup, there is a minimum upstream bandwidth requirement. The downstream bandwidth requirement is also low because only a single copy of CCC content needs to be delivered to each RDC. Hence, the connection between the RDC and the CDC can be via a private data network or over the Internet. In the latter case, the cost is reduced significantly, because the performance and bandwidth costs are improved dramatically. Geographically, there should be an RDC for each metropolitan area, such as the greater Seattle area, the greater Philadelphia area, the greater Wilkes-Barre/Scranton area, etc. An RDC can also be built for each state or groups of states if the population density is low (the Dakotas, e.g.).

In addition to the CDC, each RDC needs to connect to: the set of LDCs served by the RDC; and the set of clients served directly by the RDC. The connectivity of the RDC to the LDCs may be by a regional broadband network. This is the responsibility of the network provider offering the network service. A higher bandwidth requirement is expected when the RDC is connected directly to the clients without any intermediate LDCs.

Local Data Center (LDC)

Each Local Data Center (LDC) supports Network Proxy Center functions, and may additionally support Web caching and similar proxy functions outside the scope of the network. Again, to reduce the bandwidth requirements of Network platform service, the Network Proxy Centers can be used to cache data close to the client. The Network Proxy center is located in the LDC. LDC is preferably located physically close to the client/user to facilitate high bandwidth transmission therebetween, and can be located at or close to a CO, Headend or ISP POP, e.g. Each LDC is preferably connected to a corresponding RDC for the region that includes such LDC, but may also be connected directly to the CDC if there is no RDC.

In addition to its associated RDC, each LDC needs to connect to the clients supported by the LDC. Since, the LDC may typically be located at or close to a CO or Cable Headend, the main connectivity to the clients are ADSL and cable modems links, although of course other connectivity options may be employed without departing from the spirit and scope of the present invention. Such connectivity is the responsibility of the respective access service provider, which may or may not be the same as the network service provider. Outlying ADSL clients are likely to be connected to a DSLAM which is back-hauled over ATM fiber to a "central" CO. In such as case, the LDC should be located at the central site and not at each DSLAM location.

Broadband Access Network

The Broadband Access Network is the 'last-mile' or local-loop connection to the client, and may be a solution such as an ADSL, cable modem, or broadband wireless connection, or the like. The network architecture is largely independent of the specific access technology employed.

End-to-end Client Connection Procedure

The connection process may involve a login procedure to authenticate the client and get authorization to use the network and its services. Once authorized, the network and its services are available to the user.

In the process, the client first initializes the connectivity to the local broadband access network. Once network access is available, the client connects to the network directory service at the CDC (i.e., 'the matchmaker') to locate the IP address of the network service provider (RDC) closest to the client. Having reached the provider, the client then obtains a list of servers, by name and IP address, from a server directory service (i.e., 'the headwaiter') to use for various elements of the service. The client then connects to the appropriate network servers as and when necessary. Some of the network servers may reside at the RDC, while others may be more local at the nearby LDC.

Use of the matchmaker and headwaiter functions allows great flexibility in that: all network devices can use an identical start-up sequence; clients can be migrated between servers/services for load balancing; new servers/services can be added; URLs can be personalized for specific client accounts; and traveling clients can 'roam' to the closest available RDC.

Logical Architecture

Figure 4:
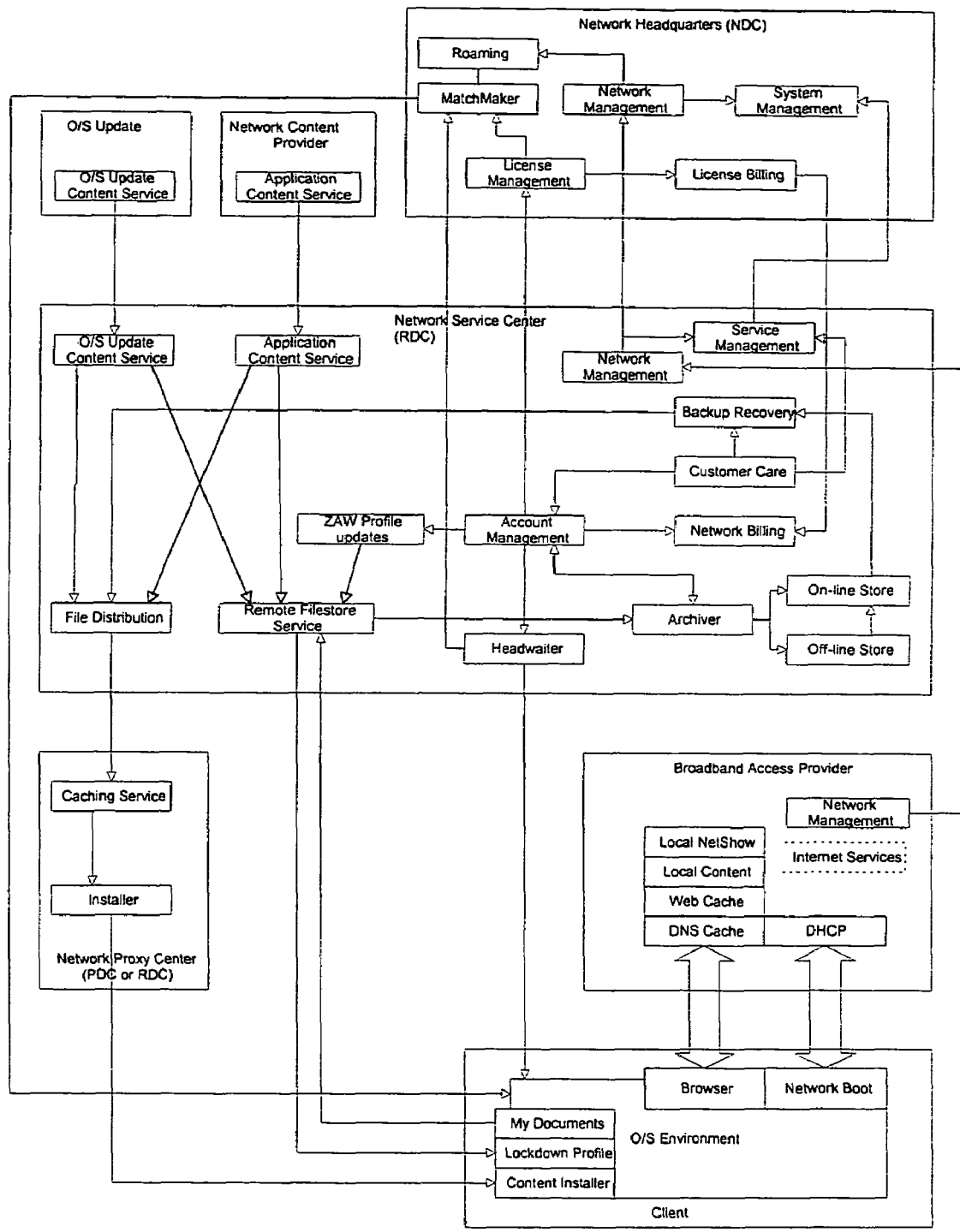
FIG. 4 is a block diagram showing the flow of information between functional entities in the network as seen in FIGS. 2 and 3.

Referring now to FIG. 4, the flow of information between functional entities in the network is shown. As may be appreciated, FIG. 4 is essentially a more detailed version of FIG. 2. Note that the arrowheads in FIG. 4 indicate the direction of information flow only. Requests, acknowledgments, flow of control, etc. are not represented for the sake of clarity only.

Network Headquarters—Matchmaker

The Network Directory "Matchmaker" function is used to locate a suitable configuration server ("Headwaiter") for the client to use. There should be a single central/national/global server implementing such function, perhaps duplicated for redundancy. The operation of the Matchmaker is described below.

Network Headquarters—Roaming

This function allows clients to move their computing devices (laptop computers, e.g.) between Network providers while maintaining the same service package. When a client roams to a 'visited' RDC, such function essentially obtains the profile for the client from the client's 'home' RDC and locates such profile, perhaps in a roaming form, on the visited RDC.

Network Headquarters—Licensing

This function tracks the use of Network licenses by the Service Centers (e.g. creation and removal of Network accounts), and arranges billing of the providers. When Account Management at the Network Service Provider creates a new account, an Event transaction is sent to the Licensing function to update the total of licenses in use (of whatever type is appropriate). Licensing then passes this information to the commercial billing system to bill the Service Provider.

Network Content Provider

Application Components are stored at the central/national/global level for cascading to the appropriate individual Network Service Center. Vendors wishing to publish their applications via the Network service are required to maintain or negotiate access to a national or regional content server. New content should be tried first on 'staging' servers with captive client machines, before publication to the general Network population.

Network Service Center—Client Profile Management

This is the 'zero administration' function that manages the subscriber's Network devices. That is, such function allows the network to manage the user's computing device so the user need not do so. Changes made to the user's profile are 'pushed' to the client on a regular basis.

Network Service Center—Archiver

This function backs up pre-determined user files on the client computing device onto a secure disk store, and eventually onto an off-line tape or similar storage system. From such store, client files and folders can be recovered in the event of a data loss on the client computing device.

Network Service Center—Content Service

This function maintains a current copy of each system component that is available on the Network service. These components can be requested by the client, and installed automatically as required. Content of this store may come from the various Network Content Providers, or be supplemented by additional local components included by the Network Service Provider.

Network Service Center—File Distribution

This function arranges the transport of data and code from the Service Center to the various Proxy Centers.

Network Service Center—Account Management

This function manages the account records of individual subscribers, including permissions, service types, and personal information associated with a subscriber or a user (e.g. worker or family member). Updates can be made directly by the user via a web interface or by a management console.

Network Service Center—Network and Service Management

These functions are only partially shown on the diagram for reasons of clarity. Network management is responsible for monitoring the network connections that are in use, and providing fault location, usage statistics, warnings of impending overload, and other similar alarms and the like. In most cases, the provider will carry out the actual management of the network. Even for a Telco offering the network, the network provision is likely to come from a different business unit. Service management is responsible for maintaining the overall service to the customer. In some cases this can include the resolution of help desk calls, such as triggering the system to restore a backup to the client. Service management has to keep track of problems that cannot be directly resolved by the help desk, identify those caused by known network problems, and correlate the cause and effect.

Network Service Center—Billing

The billing function receives account events from the Account Management function and tracks the payment of funds accordingly.

Network Service Center—Remote File Store

This function holds server-side copies of files specific to client machines. This includes mirroring server space for relevant folders on the client machines. Such space is 'Read/Write' for each client. In contrast, the 'Content Service' spaces are Read-Only and shared between many users.

Network Proxy Center

The Network Proxy Center provides bandwidth economy and latency reduction between the client and Service Center. When new operating system or application components are made available to clients by the system, they are posted as self-installing packages to the Proxy Centers, thereby allowing the clients broadband access to the new data.

Physical Architecture

Figure 5:
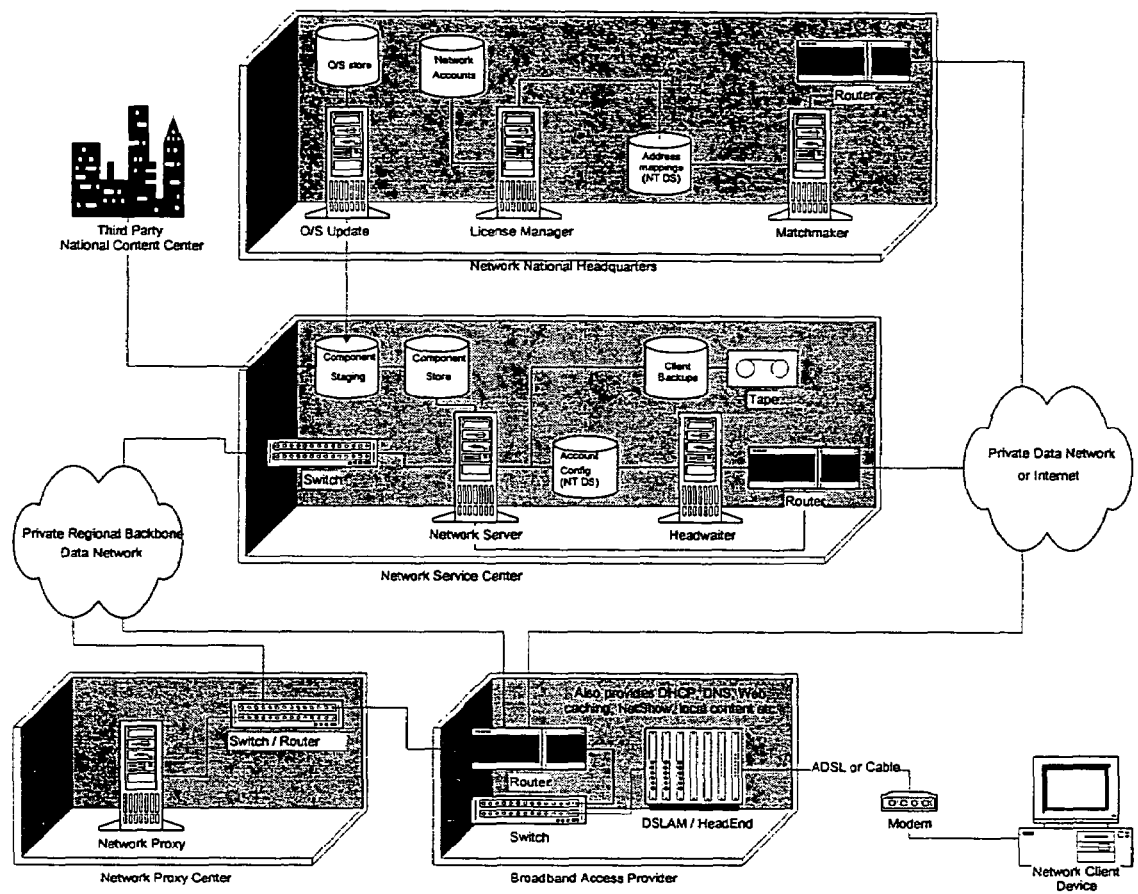
FIG. 5 is a block diagram showing a simple realization of the network as seen in FIGS. 2 and 3.

FIG. 5 shows a simple realization of the above-described logical architecture. As should be evident by now, there are three physical locations for network-specific equipment to reside: the LDCs, the RDCs, or the CDC.

The LDCs are each located in areas amenable to direct broadband access to client computing devices at user premises. Typically each LDC is co-located with any Internet-related servers that are provided as part of the ADSL or Cable modem service (e.g. Web caching, DNS caching, DHCP). Of course, the LDC is the best physical location for the Network Proxy Center functional entity. Such function is optional and depends on the regional network architecture and population distribution for the network service provider.

The RDCs are each located centrally to a large community of users. For example, the average Telco serving an area such as the Commonwealth of Pennsylvania, or region such as New England, for example, might have only one or two RDCs for its entire network. Typically such RDC is co-located with large server pools offering such services as Email, News, Chat, Web hosting, Local content, and so on. Each RDC contains the functions of the Network Service Center functional entity, and may additionally host one or more Network Proxy Center functional entities for the benefit of customers physically located relatively close to the RDC. Each RDC may require manned operation to cope with network faults, and requires good quality services and redundancy to cope with such faults.

The CDC is centrally located in a relatively secure location, especially inasmuch as loss of functionality at the CDC could cripple the entire network. The CDC includes Network National Headquarters functional entities, and may also include Network Service Center functional entities for clients in the region, if such Network Service Center functional entities are not hosted at an RDC for such clients. Additionally, the CDC may include CCC functions for the distribution of at least some content such as operating system updates and applications.

Broadband Access Network Issues

The network of the present invention is designed for offering over any broadband access network, both to residential and small business users. However, the type of network operator will affect the service architecture greatly.

Access Providers

Each type of network access provider has its own peculiar deployment issues.

CableCos (Cable TV companies) are expected to deploy the network over a cable modem system such as MCNS or IEEE 802.14. These are essentially extensions of Ethernet to the home, and behave more or less as simple LANs. However, the network is also intended for offering to small (or even large) businesses, few of which are wired for cable.

Telcos (Telephone companies) are expected to deploy the network by way of ADSL lines, at least presently for the medium term. ADSL may be used to carry Ethernet frames, in which case the service operates very similarly to the Cable modem case. However, many Telcos may opt for an ATM-based network, which adds some additional complexity to the client. However, this difficulty is offset by superior quality of service and the wide-area network attributes of the ATM architecture.

Wireless operators may be expected to deploy the network of the present invention in addition to the wire-line operators. Also, other non-traditional broadband delivery systems may be anticipated to deploy the network.

Access Technologies

Access technologies deliver bandwidth over the 'last mile' to the subscriber premises. In Telco environments, this is the 'local loop' solution.

'Frame based' indicates an 'Ethernet like' service, with connectionless packet traffic arbitrated by Ethernet MAC layer protocols. There are two main forms of Frame-based broadband access: Cable Modems and early ADSL system. In each case, the modem provides an Ethernet port for the client to attach their equipment, typically a UTP interface or the like. This approach is simple initially, but may prove expensive when scaling to larger populations. It also introduces regulatory complexity in some territories where Telcos are restricted or prohibited from providing Layer-3 services. Network service over frame-based broadband access is predicated upon the use of DHCP to obtain an IP address and DNS lookup to find the Matchmaker server.

Current ADSL development is focused on the use of ATM as the Layer 2 protocol. All Layer 3 protocols can then be kept in a separate domain of ownership, greatly simplifying the regulatory situation. Initially, some networks may offer ATM service using predefined PVCs. In this case, the network may be offered either via an "ISP-type" router connection that is also used for other traffic (e.g. web browsing), or by means of a separate dedicated PVC that goes to the Network Proxy Center. As on-demand ATM connections become a reality, Network clients will be able to "dial" to the ATM address of the Network Proxy Center directly as required.

The management of the access network is primarily the responsibility of the network operator.

Backbone Network

A backbone network is required to carry information between the LDCs, RDCs, and CDC. Such a backbone network is inherently long-distance and requires national or international reach.

While tempting to suggest, the traditional Internet as a service is not suitable for a network backbone, especially inasmuch as traffic of this kind is forced to transit through NAPs, which are heavily congested. Private Internet service, e.g. peer service from a big provider, would not suffer this congestion, but is prohibitive due to connection and access costs. Fortunately, the network backbone for the present invention does not require general Internet access. Clients are only connected to local servers, and these connect to specific parent sites. Therefore more economical point-to-point links or data services may be employed.

Telcos offer a number of backbone services. At one level there are PDH and SDH (SONET) transmission pipes. These provide low-latency point-to-point connections. Telcos also offer packet data services such as X.25, Frame Relay, and SMDS. These have the advantage of providing statistical gain. Although such packet services have relatively high latency, the network of the present invention does not require especially low latency. Satellite carrier networks are also a useful component, and allows inclusion of network partners who do not have suitable backbone services available to them from the Telco networks.

There are several technologies available for use in the backbone network employed in connection with the network of the present invention. Such technologies and their strengths and weaknesses are as follows.

Ethernet technology is not a viable option for most backbone connections; it would require dedicated "dark" fiber, which is impractical for most situations. Frame Relay technology is cheap and plentiful, but its main weakness is the relatively low bit rates that can be handled. Still, this may be a good candidate in some less demanding cases. SMDS technology, where available, offers packet data service at the sort of broadband rates believed to be useful. The security and Closed User Group capabilities of SMDS would be an advantage over more open networks.

As networks incorporate ATM in their backbones, Permanent Virtual Channels and Paths are becoming available. These provide the flexible-bandwidth and point-to-point connections needed for the network of the present invention. This is especially true for start-up networks that initially specialize in ATM. While most public networks will offer Managed PVCs and PVPs for quite some time, dynamic switched VCs will emerge as a very effective solution. These have the special advantage that servers can request the bandwidth they need as they go, without having to estimate in advance. It also gives better resilience in the case of connection or equipment failure, as a lost connection can be retried or rerouted without management intervention.

Management of the backbone network rests with the service provider. However, the CDC may be interested in statistics and fault location information, and would like to obtain this information automatically from the public network. TMN technology may be appropriate here, if available from the Telco. In particular, where network outages occur, the CDC needs to isolate the problem quickly so that it can respond to Helpdesk calls with the right information. Event logging is also useful for this.

Server Site Architecture

This subsection discusses the components and connectivity within each Network location.

Network Proxy Center

Figure 6:
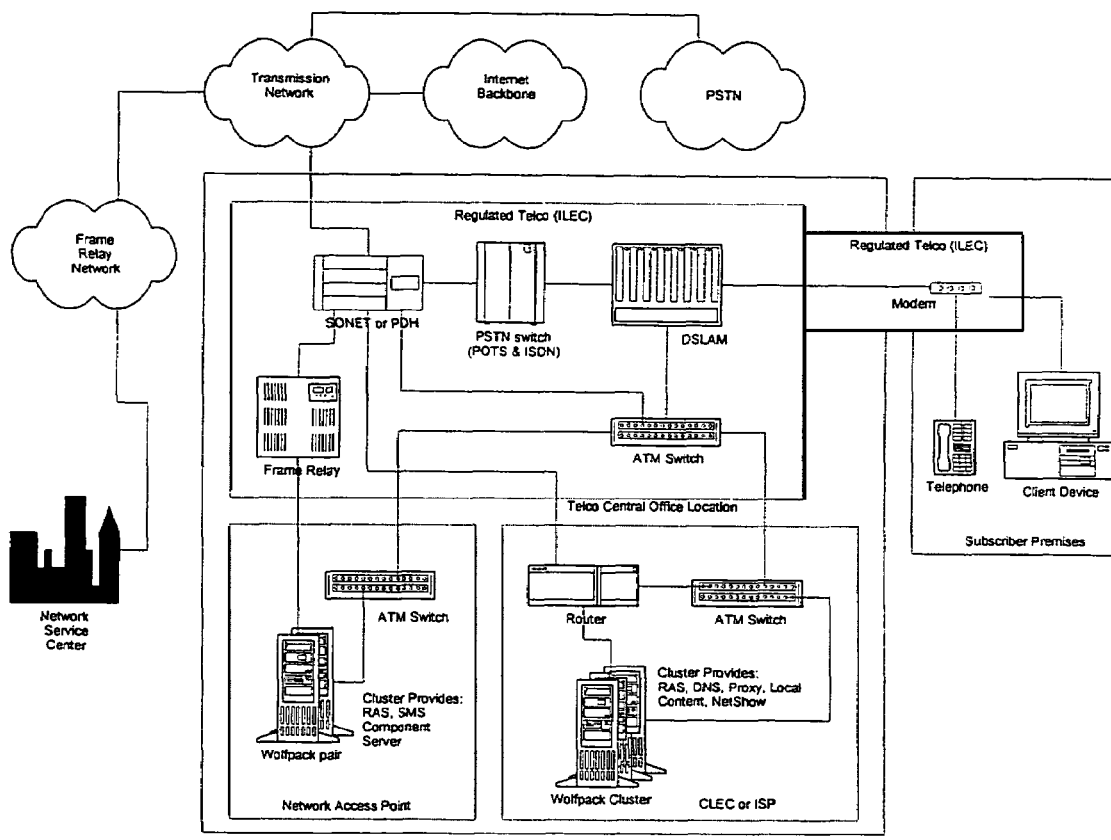
FIG. 6 is a block diagram showing an example of a Network Proxy Center of FIG. 5 attached to a Telco Central Office location.

Each Network Proxy Center, physically located at an LDC, is the location closest to the end-user, and as such handles the most bandwidth. FIG. 6 shows an example of a Network Proxy Center attached to a Telco Central Office location. The choice of ATM as the access network and Frame Relay as the backbone in FIG. 6 is by way of an example and may differ; also, different Telcos may make alternative groupings of equipment, all without departing from the spirit and scope of the present invention. For regulatory reasons, the network service likely cannot be part of the ILEC domain, as it provides services above the Layer 2 boundary.

Figure 7:
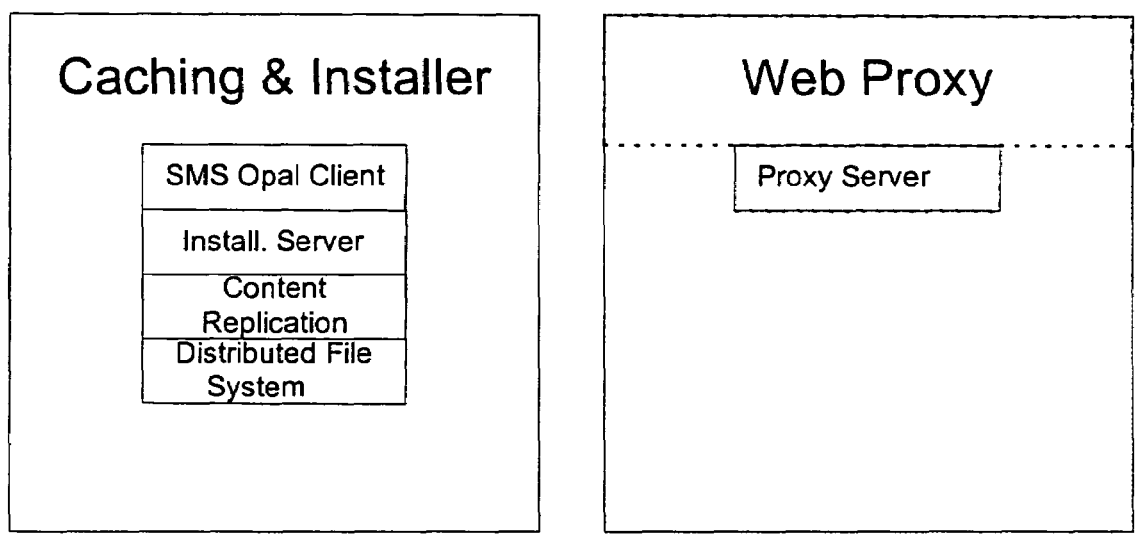
FIGS. 7-9 are block diagrams showing the software components required to provide the network service at the network proxy center, network service center, and network national headquarters, respectively, of FIG. 5.

FIG. 7 shows the software components required to provide the network service at each network proxy center. Note that the Web Proxy function is optional. However in many cases this may be a useful addition to the installation if no other local caching is available.

User-specific data is not sent via the Proxy. This cache is intended for files that will be accessed by many users, so as to minimize requests direct to the RDC for most of this material. User-specific data such as My Documents files will be sent directly between the client and RDC. This reduces the complexity of managing the Proxy sites. Proxy data need not be backed up as any files can always be restored from copies at the RDC. Self-installing packages are propagated to all the Proxy locations. Each Proxy site then may customize the installation packages for individual clients as required.

The downlink between an LDC and each subscriber needs to be very fast, and allow high bandwidth to and from the client machines. For a frame-based network, this should be at least 100BaseT. However, a better solution is a direct ATM connection to the Router or Switch that hosts the broadband lines. The uplink between an LDC and an RDC depends on locally available resources and technology. Where the LDC and RDC are co-located, this is not really an issue. In such a case, 100BaseT or ATM OC-3 is quite cheap to provide. Where there is geographical separation of the LDCs and RDC, a private data network should be used. The bandwidth may be too high for Frame Relay in which case an SMDS or ATM service is suitable. If these are not available, direct transmission such as a PDH or SDH (SONET) carrier is required.

Within each LDC is located a set of clustered servers linked by either Ethernet or ATM and sharing a disk array over SCSI. The use of clustering provides 1:1 sparing and hot standby.

Network Service Center and Network National Headquarters

Figure 8:
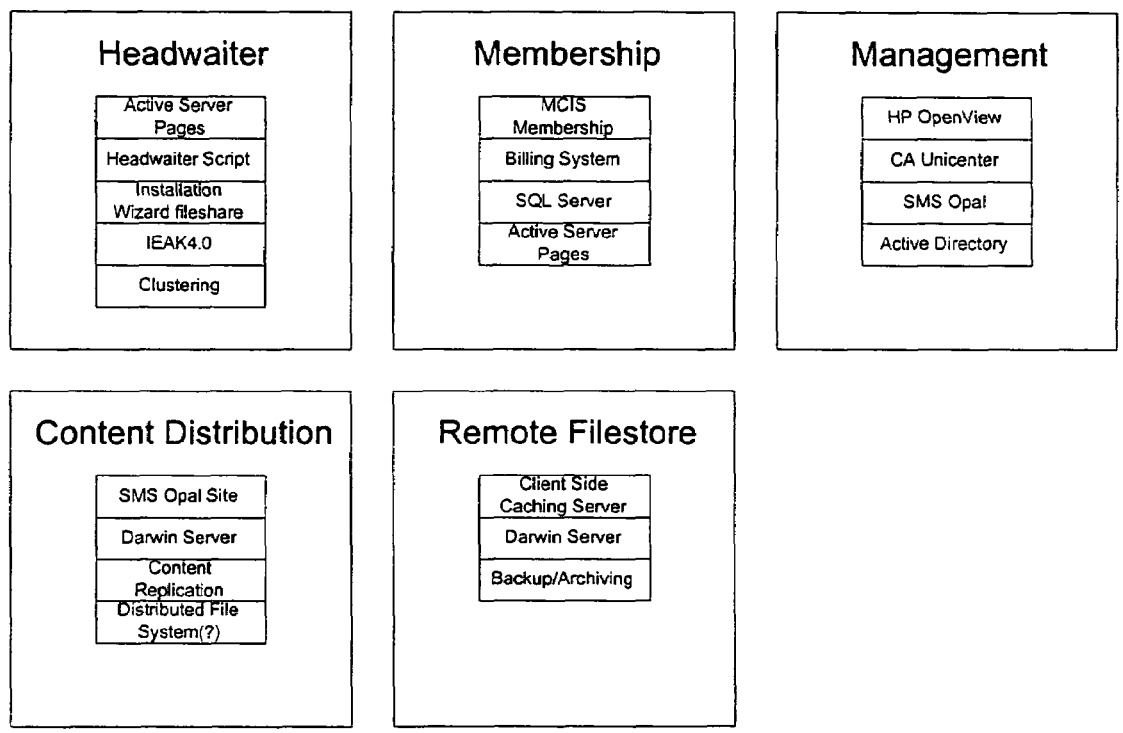
Figure 9:
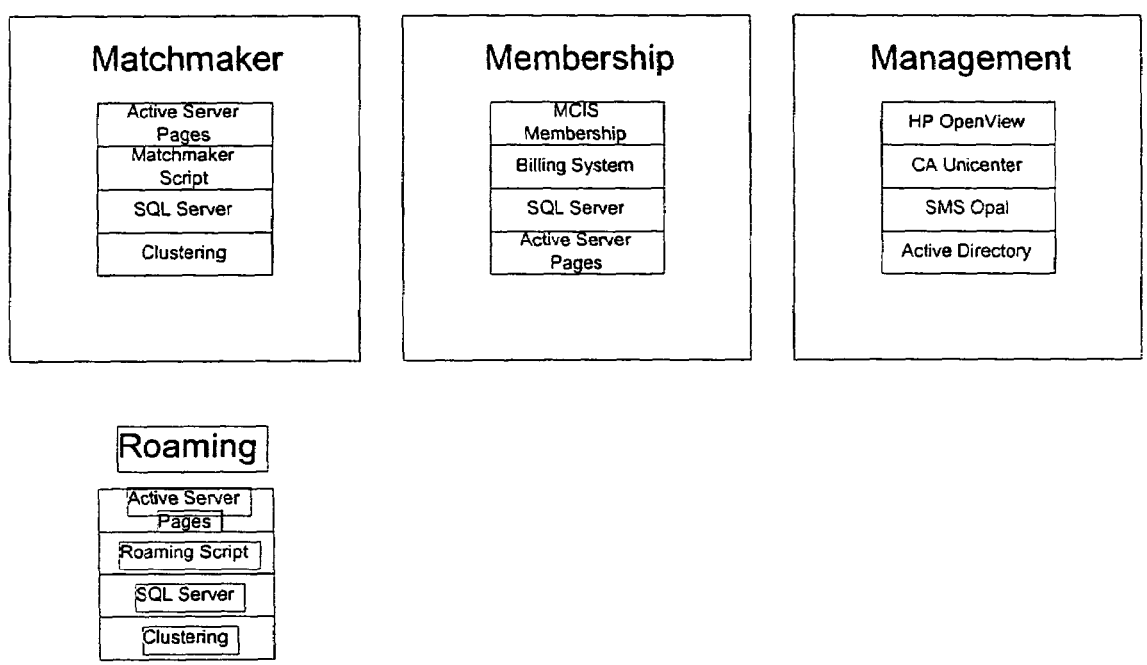

FIG. 8 shows the software components required to implement each network service center as physically located at an RDC and FIG. 9 shows the software components required to implement the network national headquarters as physically located at the CDC.

End-to-End Service Operation

The following is a description of the procedures employed to create a user session on the network of the present invention. Presumably, a network shell is implemented as a preinstalled active desktop component on the user's computing device. Such shell has access to web browser capabilities by invoking browsing functions as needed. However, the browser on the computing device need not be modified except perhaps cosmetically.

Figure 10:
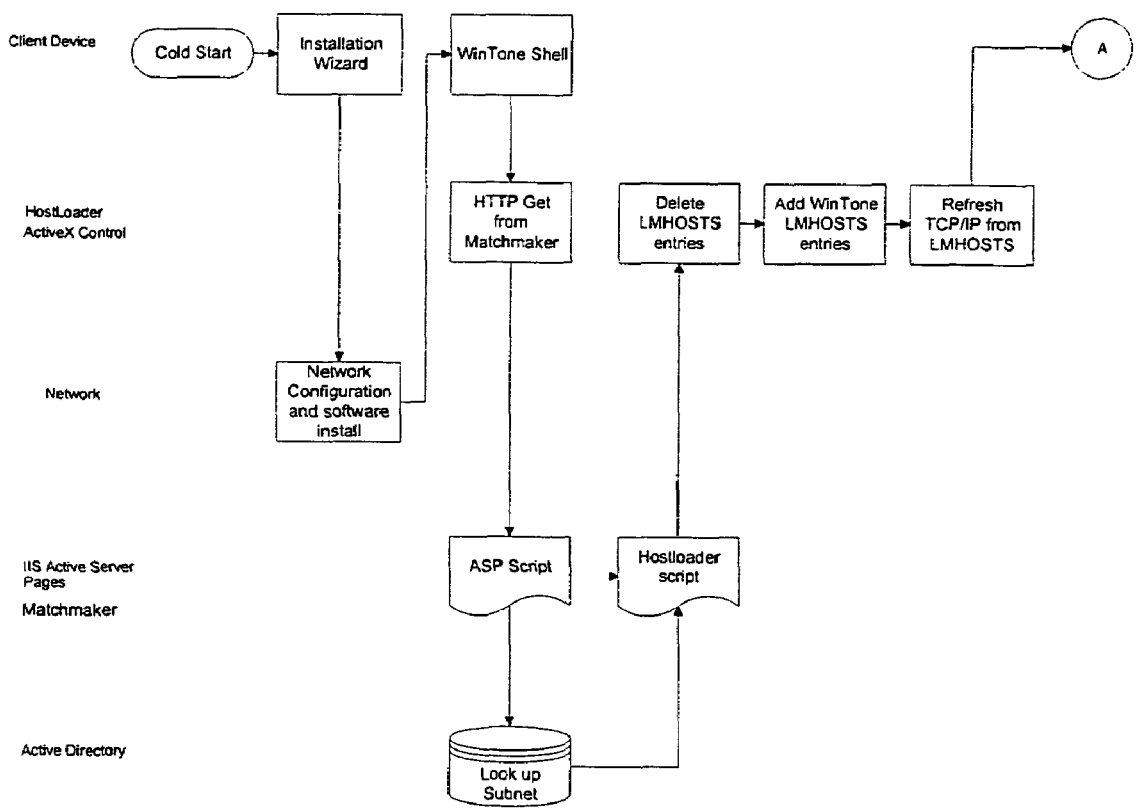
FIGS. 10-12 are block flow diagrams showing steps performed at various locations during the first 'Matchmaker' stage, the second 'Headwaiter' stage, and the third 'connection' stage, respectively, of the startup procedure in one embodiment of the present invention.

FIG. 10 shows the first stage of the startup procedure in one embodiment of the present invention. The first necessity is to initiate the network connection. The procedure for this depends on the network technology that is present. For Ethernet-based services, DHCP is the preferred method for obtaining an IP address and the necessary TCP/IP configuration information. Once DHCP has configured the client, it can use the indicated DNS to find the Network Matchmaker server on the network (at the CDC). In connection with an ATM-based service, a somewhat similar process may be employed. Once connected to the network, the client installer opens a share on a specified server and installs current versions of the software the service will require. This will include a web browser, communications utilities, and the latest Hostloader ActiveX control which will then be invoked.

As shown in FIG. 10, the Hostloader control executes an HTTP "Get" request to a URL at the Matchmaker site. The Matchmaker executes an Active Server Pages (ASP) script which examines the source IP address of the request, together with other information from the client, and determines the Headwaiter address with responsibility for the client's subnet. The Matchmaker script generates text output to the client containing instructions for the HostLoader ActiveX control.

The downloaded instructions are then executed, which tells the control to erase the current LMHOSTS file and add new entries to include the name and IP address of the assigned Headwaiter host. Once these entries have been made, the HostLoader control is told to refresh the NetBios cache by executing a "nbstat-R" command on the client. This causes the TCP/IP stack to reload itself with the new LMHOSTS entries, and the assigned names are now available for use. Once this is completed, the client-side script finishes by telling the browser to navigate to the Headwaiter by name. The TCP/IP stack handles the translation to an IP address using the new LMHOSTS information, and the browser connects to the Headwaiter site (at an RDC geographically close to the client).

Figure 11:
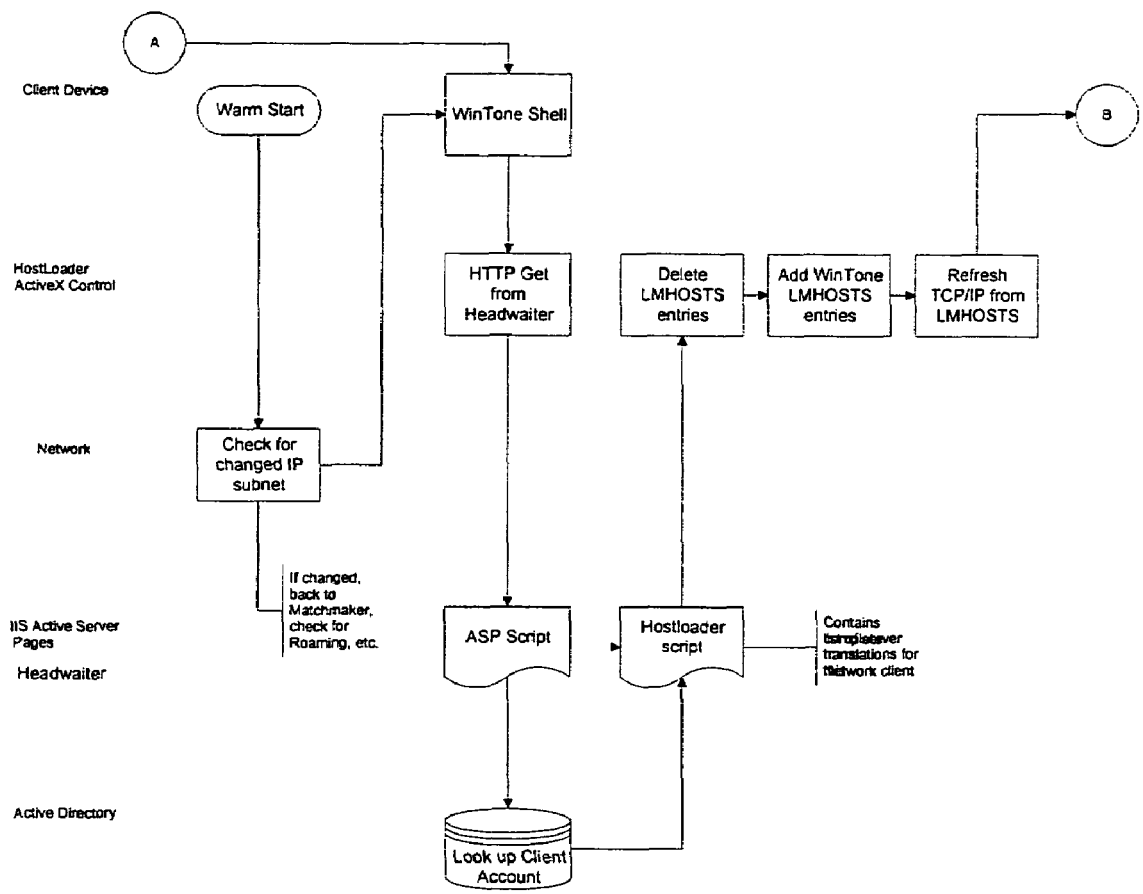

FIG. 11 shows the second stage of the startup procedure in one embodiment of the present invention, where the client shell interacts with the Headwaiter server at the RDC. Procedurally, the transaction is almost identical to that with regard to the Matchmaker as shown in connection with FIG. 10. However, the function of the Headwaiter is different. The Matchmaker is responsible for 'localizing' the service down from the central/national/global level to a specific network provider. The Headwaiter by contrast is responsible for 'personalizing' the service for an individual user. Like the Matchmaker, the Headwaiter performs such function by supplying the client machine with a specific set of machine name translations to use in the TCP/IP stack. The Headwaiter will typically install a large group of server names on the client, and new names can be added dynamically as the service evolves. Names may also change over time, for purposes of load balancing or migration of users. As the Headwaiter function is called every time a session begins, the client configuration is kept current.

During the start of each user session, the client needs to check to see whether the client machine is still on the same IP subnet as before. Subnet change may occur if the machine is moved, or due to local network reconfiguration. Changes within a subnet do not require any action; this is common when DHCP or PPP is used to allocate addresses dynamically. If the subnet has changed, the client needs to contact the Matchmaker again (FIG. 10). In some cases, the client may be roaming, in which case the Matchmaker will take appropriate action by assigning the client to a different Headwaiter at a different RDC. In other cases, the client may be changing service provider and need to create a fresh account.

Figure 12:
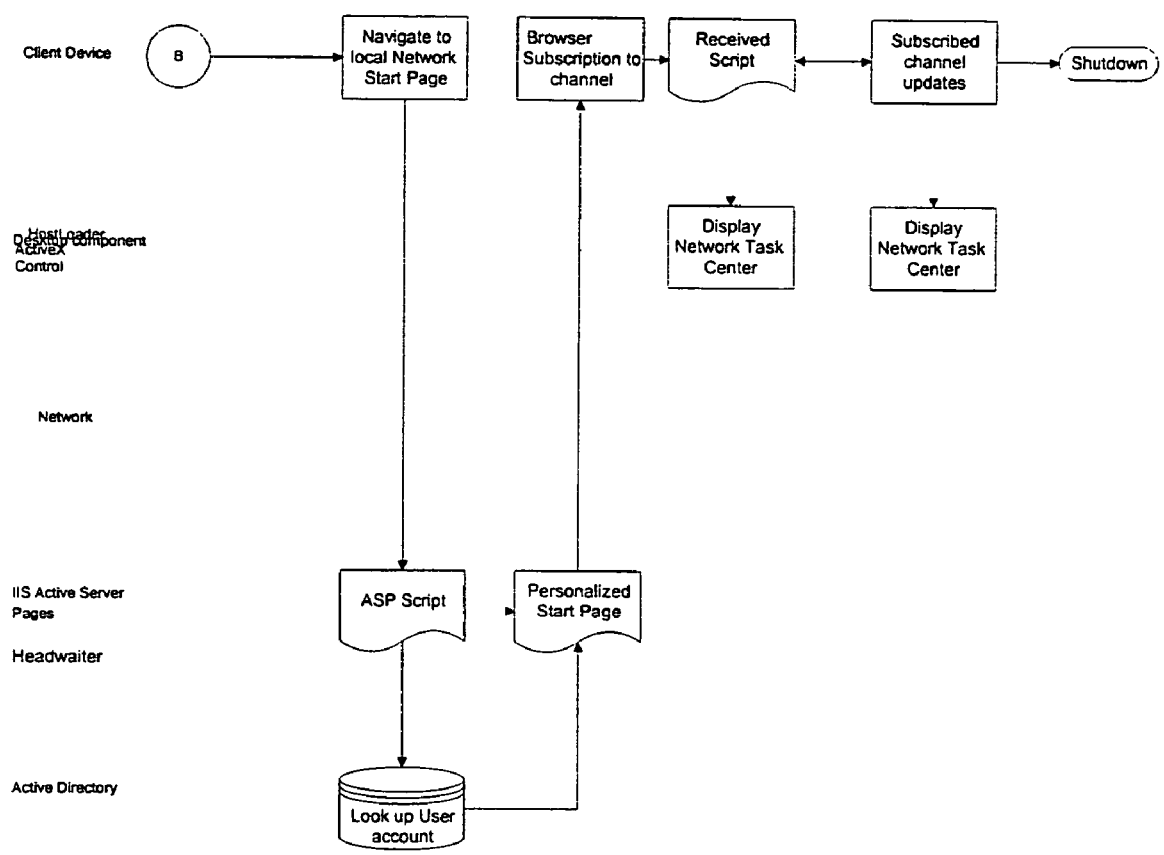

FIG. 12 shows the third stage of the startup procedure in one embodiment of the present invention, where the client shell completes the session configuration and connects to the Network service itself. In one embodiment, a CDF script is delivered to the client machine, and new capabilities and functions are thereby 'pushed' down when available. Such script also allows the client's 'Task Center' Active Desktop component to reflect current localized information and options for the user. For those functions that can operate via a Network Proxy Server, the client will be pointed at such a machine in their local LDC. This will allow broadband access to large files that many users will want to install, such as commercial applications. A set of mappings to the various client administration servers will also be used. The client is invisibly hidden from any change of client administration server by re-mapping at the headwaiter. This includes file-shares on networked servers, SMS servers, Active Directory, and so forth. The backup server at the RDC will also be identified. This may be routed via the LDC, or go direct depending on the needs of that specific user. Some of the low-level client services will also require specific servers, such as Clock synchronization. Because the Headwaiter is extensible with new names on the fly, new servers can be added as required and the clients can be given IP address translations for the new servers.

User Scenarios

Set forth below are user scenario descriptions of network managed service for varying types of customers.

Small Office

Background: Jill is a marketing events specialist and runs her own business out of a small office. She has one other full time partner, the rest of her staff are contractors hired on a per project basis. Jill has just booked a major event with a large local company, XYZ Inc., and now needs to staff up her office to handle the new work.

Prior to employing the network-managed PC service of the present invention, Jill was accustomed to leasing additional computer equipment for her temporary staff. The leasing company would deliver PCs and set them up. Quite often, she'd find that the software she had requested was not properly installed and she'd have to spend considerable time either fixing it herself or waiting for the leasing company to make the corrections.

Jill would like to obtain faster and more responsive software service. She recently learned that her local Telco is offering the network-managed PC service of the present invention, where she can lease PCs directly from the Telco that will be fully managed by the network. Following is a series of events initiated by Jill or others and actions that are taken in response thereto:

| Event | Action |
|---|---|
| Account Provision | |
| Account manager informs Jill that the Network-managed PC service would be ideal for her needs. The phone company will take care of everything she needs - installing ADSL service, delivering and connecting Network PCs, and servicing the systems. She learns that she can subscribe to many of the software applications she needs rather than purchasing them. | Account manager brings up Jill's record on the Telco's subscriber management system. |
| This sounds perfect for Jill, she proceeds to order 2 Network PCs. | Account manager provisions new services: ADSL service and modem installation Network managed service for 2 PCs 2 PC hardware leases |
| The account manager takes Jill's service order and sets up a service appointment for ADSL service installation. | Subscriber management system generates Network service request and dispatches to network CDC for authorization. |
| Service Installation | |
| A few days later, the Telco service technician arrives and performs the following services: ADSL line and modem installation delivers 2 Network PCs and connects them to the ADSL modem via a mini-hub (this lets the 2 systems share a single modem) | Network PC boots up on network, acquires an IP address through DHCP and then contacts the Matchmaker at the CDC. This provides the IP address of the local Headwaiter in the Telco's RDC. This provides access to local Network services. |
| After turning on the Network PCs the service is tested by running basic diagnostics | Network PC runs built in hardware diagnostics. |
| Login | |
| Jill received her Network account information in mail. This includes account login name, password, and domain information. For her convenience, she also receives 2 smart cards, which have been pre-programmed with this information. | The CDC processed the original service provision request and created a new account assigned to Jill. The smart card is generated and the account information is mailed back to Jill. The CDC transmits the new account information to the Telco's RDC so that it is ready for Jill. |
| Jill goes to one of the Network PCs. It shows a login screen. She has the option of either typing in the login information or inserting the smart card into the reader port located in the front of the PC. She inserts the card and is logged into the network. | When the smart card is inserted, the Network PC reads the account authentication information data stored and passes it onto the membership authentication server located in the RDC. This authenticates the login. Profile for account is looked up and downloaded to Network PC. |

-continued

| Event | Action |
|---|---|
| Service Subscription | |
| After logging in, Jill notices that the Network PC screen looks a little different from what she had been accustomed to before. It's far simpler - there are only a few icons on the desktop, not the dozen or so she's used to seeing scattered over the desktop. The Start button also has few choices. She likes this - less stuff for her employees to get in trouble with. | Network PC starts with a tightly locked down desktop. Non-essential items have been removed. |
| One new thing that Jill does notice on the desktop is an animated panel with the phone company's logo and ads for available services. She clicks on this for a closer look. This brings up the phone company's Network service web site. | The network services shell appears on the desktop. This is part of the default profile for any subscriber. |
| She takes a quick video tour of what's available and learns she can subscribe to applications. She understands that her PC is basically a blank that can be loaded with applications by way of the subscribed-to network. | Video quick tour is provided through a NetShow server playing streamed video. |
| She decides to subscribe to a word processing application. She clicks on the subscribe button and authorizes the service. She will be billed $19.95 on a monthly basis - this will appear with other ADSL service charges on her monthly phone bill. | The subscribe to application transaction is recorded in the Telco billing system. This also triggers a modification to the subscriber's profile (application is added to app list) and launches the application installation package. |
| The application is then installed on the Network PC. Because of the high speed of ADSL, the entire process takes about 15 minutes - faster than installing from a CD-ROM. | A self-installing installation package is delivered to the subscriber PC. Since Jill's subscriber profile now includes the subscribed-to application, installation is permitted. |
| Telecommuting Access | |
| Jill contacted XYZ Inc. to inform them that she was getting ADSL service. XYZ Inc. has been working with the phone company to make their network VPN accessible by adding PPTP servers. Jill can now take advantage of this by using PPTP to access the XYZ Inc. network over ADSL. This will give her much faster performance than she had over a 28.8 or 56k modem. | XYZ Inc. installs PPTP server using NT server. This server is connected to the Internet via an ISP connection. The Telco and XYZ can also configure a direction connection (T1 or DS-3) if faster local telecommuting access is required. |
| The XYZ Inc. network administrator creates a limited access account for Jill and assigns her a user name, password, and domain. Jill also receives a pre-configured connection object in email that she can use for accessing the network. | XYZ uses a Connection Manager Adaptation Kit to create a connection object. This stores the configuration information necessary to establish the connection (i.e. IP address of PPTP server). This object can be distributed in any number of ways including email. |
| Jill places the XYZ connection object on her desktop and double clicks on it. Up comes a dialog box that requests her login account information. | When the XYZ connection object is activated, a dial-up dialog appears prompting for login info. |
| She enters this information and logs into the network. After logging in, she finds that she can access the network share points for her project and pull down the required specification documents. | The PPTP session established and account login information is authenticated by a server in the XYZ network. |
| Recovery | |
| After working several weeks on the project, one of the Network PCs fails to boot properly. Jill calls up the Telco and requests service. The service technician attempts to diagnose and correct the problem over the phone | Telco technician attempts to assess PC status using remote monitoring and hardware diagnostics. Diagnostics determines a hardware failure. |

-continued

| Event | Action |
|---|---|
| but determines that the PC needs to be replaced. A service order is logged. | |
| Later that day, a service technician arrives with the replacement Network PC. He replaces the defective unit and verifies that it works. | Replacement Network PC is plugged into the network and goes through the same boot procedure as described above. |
| Jill then logs back into the network. The system downloads her profile and adds the subscribed-to application icon back to the desktop. The first time Jill accesses such application, it is re-installed from the network. | When Jill logs in, her policy template is pushed down to the PC. Since this includes the subscribed-to application, the corresponding icon is shown even though such application is not yet installed. Installation is triggered by activating the icon. |
| Jill had previously configured her data files to be automatically cached on the network so she can still access them. Jill is thrilled that she's back in business and her data and PC configuration have not been lost. | Using client side caching, data files can be stored on the server with a local copy on the PC. |

Corporate Telecommuter

Background: Jim works as a manager in a Fortune 500 company. He frequently accesses his corporate network from home during off hours to retrieve email, access the corporate Intranet and file servers. His company is currently set up for RAS access through 28.8 and 56 k dial-up lines. Although this works, Jim is frustrated by the slow performance and believes he could be much more productive with a faster link. He's investigated ISDN but decided that the performance improvement is probably not worth the effort and cost of getting the service. He's recently learned that his company now implemented access to the network-managed PC service of the present invention for remote access using an ADSL modem.

| Event | Action |
|---|---|
| Account Provision | |
| Jim calls his IT help desk and requests ADSL service. Helpdesk points him to an internal web site that contains information on the service and a registration form, which Jim fills out and submits. Since this PC will be used strictly for work purposes, he opts for a Network PC. This PC will be provided by the Telco with monthly lease charges billed to his company. | IT has set up an ADSL information and registration site on the corporate intranet. This provides basic information about the service and limitations. The registration form takes down basic service provision information as well as Jim's phone number. This is used by the Telco to perform a loop check to see if Jim is in the ADSL service area. |
| The following week, Jim receives confirmation from IT that his ADSL application has been approved. He is contacted by a Telco representative who schedules a service appointment for his home. | The Telco representative provisions new services: ADSL service and modem installation Network managed service for 1 PC The Telco's subscriber management system generates a network service request and dispatches to the network CDC for authorization. |
| Service Installation | |
| A few days later, the Telco service technician arrives and performs the following services: ADSL line and modem installation delivers a Network PC and connects to ADSL modem | Network PC boots up on network, acquires an IP address through DHCP and then contacts the Matchmaker at the CDC. This provides the IP address of the local Headwaiter in the Telco's RDC. This provides access to local Network services. |
| Tests the service by turning on the Network PC and running basic diagnostics | Network PC runs built in hardware diagnostics. |
| Login | |
| Jim is now ready to use the Network PC for the first time. The Telco has set up a Network account and provided Jim | The CDC processed the original service provision request and created a new account assigned to Jim. The new |

-continued

| Event | Action |
|---|---|
| with the necessary login information (user name, password, name). He enters this information at the network login prompt. | account information is forwarded to the Telco's RDC so that it is ready for Jim. The information entered by Jim could alternatively have been securely coded on a smart card, which he would have inserted into a reader on the Network PC. |
| He is then greeted by a dialog box that welcomes him to the network and asks him to wait while his machine is prepared for first time use. Jim performs other tasks, and upon returning finds the installation has completed. He inspects the system and finds that a word processing application and an Internet browser have been installed. Telecommuting Access | Once Jim logs in, his profile is looked up and downloaded into the Network PC. His company's IT dept. has made prior arrangements with the Telco to have Network PCs for its employees to be configured with the word processing application and the Internet browser on a subscription basis. Since the system currently lacks these applications (it's basically a blank), they are installed. |
| After the first time installation process has finished, Jim sees an icon labeled "connect to corporate network" has been installed on his desktop. | Jim's profile also contains a connection object that's placed on his desktop. When activated, it creates a VPN through the Telco's system to the company's PPTP server. The Telco administers the network such that the connection object only appears in the profiles of subscribers who are employees of the company. Jim still needs to enter his standard login authentication information to access the company network. |
| He selects this icon and is prompted to log into his company's network by entering his username, password, and domain. He enters the same information he uses at work. After a brief pause while the system makes a connection across the network, Jim receives a dialog confirming the connection at 2 Mb/s. Jim is now free to do the same type of work that he does in the office including accessing email, network file servers, corporate intranets access, performing teleconferencing/collaboration, receiving streaming videos, and the like. The performance is very similar to what he experiences at work. | Once the PPTP/L2TP connection is established, Jim has secure access to the corporate network. Since he has entered his authentication credentials, he has full access to the same resources he does when in the office. |

Novice Consumer

Background: Ted has been thinking about getting a PC for awhile. He'd like to use it to send and receive email, write correspondence and other documents, and access the Internet. Ted hasn't bought a PC yet because he's concerned that it may be too expensive, difficult to learn, and hard to maintain.

Recently, Ted about the heard about the network-managed PC service of the present invention which can be accessed by way of his Cableco to provide high speed access to the Internet.

Ted goes to his local consumer electronics retailer to learn more and decides to buy a Network PC and sign up for the network service.

| Event | Action |
|---|---|
| Account Provision | |
| The salesperson sells the Network PC to Ted, sets up the Network service for the PC, and arranges a service appointment with Ted's Cableco to install a cable modem at Ted's residence. | This is similar to the cellular phone account signup model. The retailer sells the Network PC and takes down the basic subscriber account information and PC ID which is passed onto the cable operator who provisions the basic service (same as scenarios above). |

-continued

| Event | Action |
|---|---|
| Service Installation | |
| A few days later, the Cableco service technician arrives and installs a cable modem in the den where Ted has put the Network PC, connects the PC to the cable modem, and turns everything on. After running a basic diagnostic test, the technician tells Ted that everything is fine and ready to use. | The Network PC is connected to the cable modem and boots up on the Cableco network. The technician enters his login credentials and then runs a diagnostic program. |
| Login | |
| Ted receives his account information along with a smart card that plugs into a slot in the front of the Network PC. Ted inserts the card into the PC to login. | The smart card contains Ted's login information with an assigned initial password which Ted can opt to change. |
| The PC puts up a message welcoming him to the Cableco network and then proceeds to install a package of at-home applications he ordered. | Ted's service profile includes the package of at-home applications. This is installed the first time he logs into the system. |
| After this has completed, Ted clicks on the help button in the network service shell and takes a video guided tour of the service. | Video based tutorials are provided through video servers located in the Cableco's RDC. |
| Recovery | |
| The Network PC stops working after several months - when Ted pushes the power button, nothing happens. He first calls the Cableco. The Cableco confirms that there appears to be some type of hardware failure in the PC since it can't communicate with the PC over the Cableco network. The Cableco directs Ted to replace the PC, and tells Ted that his data files and loaded software will automatically be reloaded onto the replacement PC. | Cableco technician attempts to assess PC status using remote monitoring and hardware diagnostics. Total lack of response and customer description indicates a probable hardware failure. |
| Ted obtains the replacement PC and connects it to the cable modem, turns it on, and plugs his smart card in. | Replacement Network PC is plugged into the network and goes through the same boot procedure as described above. |
| Sure enough, the PC boots up and proceeds to reload the package of at-home applications and the data files. | When Ted logs in, his policy template is pushed down to the replacement PC. This causes the package of at-home applications to be reloaded since it is not present on the system. Recovery of personal data is done through client side caching. |

Network Transactions

Based on the disclosure set forth above, and to summarize, in the network of the present invention, a central data center (CDC) is operatively coupled to one or more regional data centers (RDC), each RDC is operatively coupled to one or more local data centers (LDC), and each LDC is operatively coupled to one or more clients by way of a broad-band communications network that may be separate from the Internet. If separate, the computing device may couple to the Internet by way of an Internet Service Provider (ISP) reachable through the broad-band network.

Figure 13:
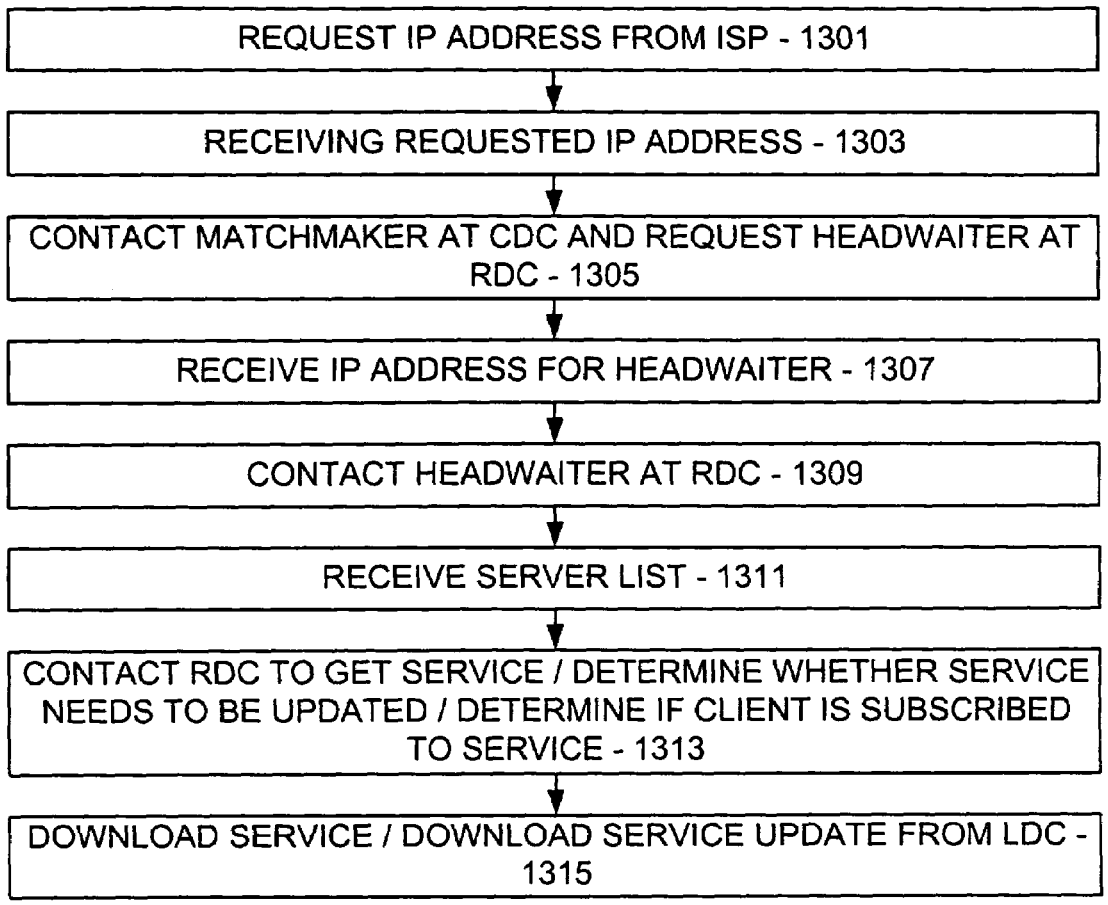
FIGS. 13-15 are block flow diagrams showing steps performed during use of the network of FIGS. 2 and 3 in accordance with embodiments of the present invention.

Various network transactions may take place:

As seen in FIG. 13, when the client (i.e., the client machine) boots up (turns on), the client automatically calls into the network and logs into the ISP by:

requesting an IP address from the ISP (step 1301); and receiving the requested IP address as allocated by and transmitted by the ISP (step 1303).

When the client is new to the network, the client initially contacts a directory service at the CDC (i.e., a 'Matchmaker') to be routed to a server list service at an RDC (i.e., a 'Headwaiter') by:

contacting the Matchmaker at the CDC and requesting a Headwaiter at an RDC (step 1305); and receiving the IP address for a Headwaiter at an RDC from the Matchmaker (step 1307).

The Matchmaker is revisited only if the Headwaiter cannot be found by the client, such as for example if the client is roaming.

Thereafter, and each time the client is booted up, the client contacts the Headwaiter at the RDC by way of the received IP address and receives a list of servers to use for various elements of the Network service by:

contacting the Headwaiter at the RDC (step 1309); and receiving the server list (i.e., server names and IP addresses) (step 1311).

With such server list, the client may then connect to appropriate servers for Network services subscribed to by the client. Use of the Matchmaker and Headwaiter allows flexibility in that clients can be directed to servers based on availability and load balancing considerations, among other things.

Each client is tied to a particular RDC, which maintains a client profile for the client. The client profile lists all the services the client is subscribed to, and causes corresponding service icons to be appropriately placed on the client display.

Thus, and still referring to FIG. 13, when a service icon is selected on the client, the client obtains the service/updates the service/contacts the service upon:
- contacting the RDC to get the service/determining whether the service needs to be updated/determining if the client is subscribed to the service (step 1313); and
- downloading the service/downloading the service update from the LDC (step 1315).

Figure 14:
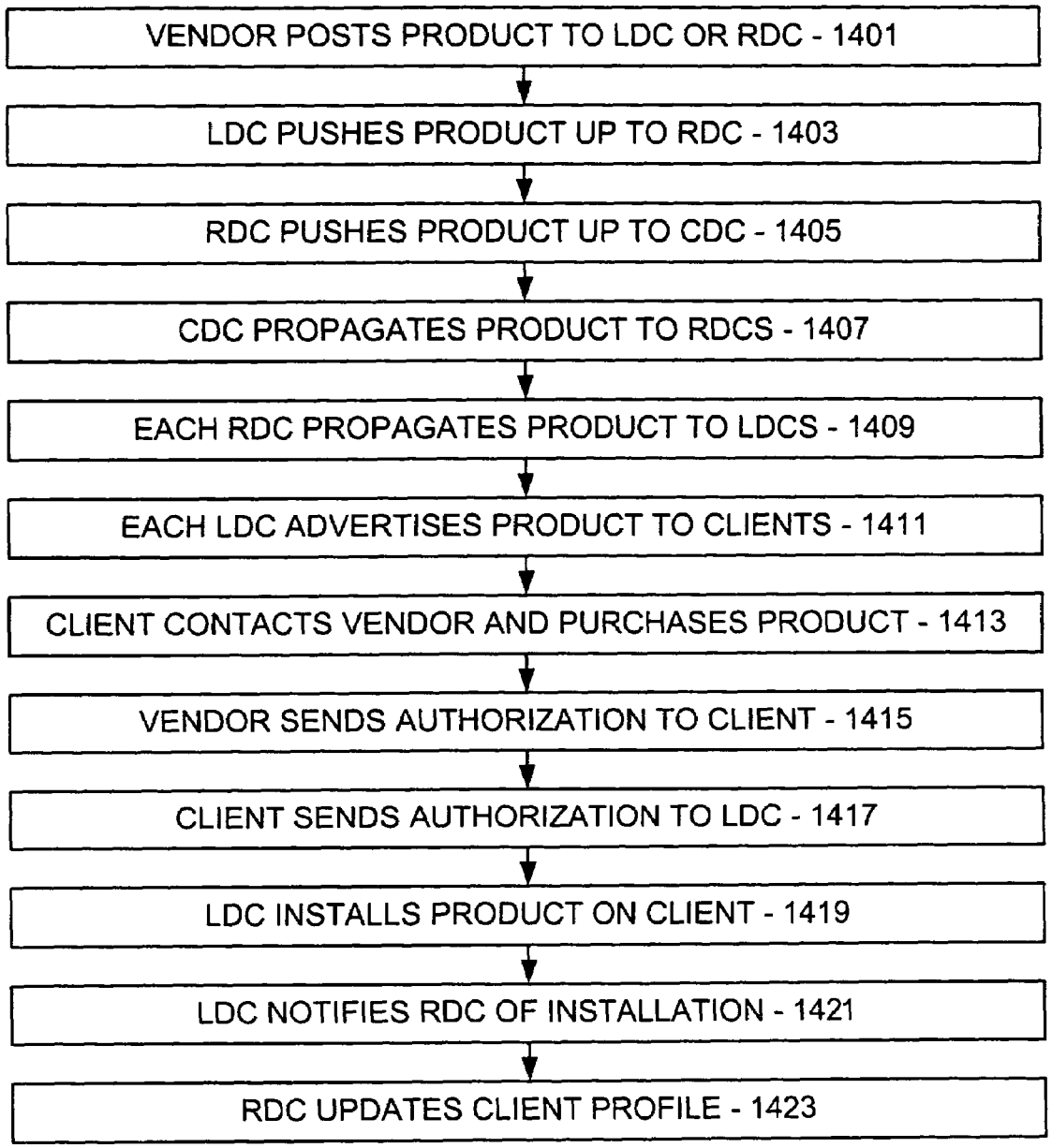

On occasion, a vendor may have a client-based product available for purchase and installation for the client. For example, the product may be a new client-based application or an update to an application. As shown in FIG. 14, to distribute the product:
- the vendor posts the product to an LDC or RDC by way of an Internet connection with such LDC/RDC (step 1401);
- if at the LDC, the LDC pushes the product up to the RDC (step 1403);
- the RDC pushes the product up to the CDC (step 1405);
- the CDC propagates the product to the associated RDCs (step 1407);
- each RDC propagates the product to the associated LDCs (step 1409);
- each LDC advertises the availability of the product to the associated clients (step 1411);
- the client contacts the vendor by way of the Internet and purchases the product (step 1413);
- the vendor sends an authorization to the client by way of the Internet (step 1415);
- the client sends the authorization to the LDC by way of a secure share (step 1417);
- the LDC installs the product on the client by way of a self-installing download file or the like (step 1419);
- the LDC notifies the associated RDC of the installation (step 1421); and
- the RDC updates the client profile for the client to reflect the installation (step 1423).

Figure 15:
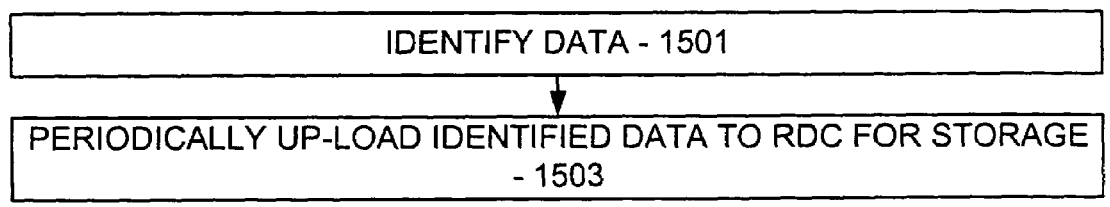

Referring now to FIG. 15, to back up client data:
- the data is identified (for example as being in a particular directory) (step 1501); and
- the identified data is periodically up-loaded to the RDC for storage thereat (step 1503).

Thus, if the data at the client becomes lost (for example if the client memory fails) the data at the RDC is down-loaded to a newly constituted client.

Network-Based Computing Environment

While the network of the present invention has heretofore been described in terms of being used to download applications and the like for installation on a client and to upload data and the like from the client for storage, it is to be understood that such network may also be employed to couple the client into a network-based computing environment. Thus, the client as part of the network can take advantage of network resources, can be directed by another client on the network to take an action, and can itself direct actions to be taken by another client on the network. Moreover, in this context, a client need not necessarily be limited to a personal computer-type computing device, but can be any device that is provided with the functionality necessary to communicate over the network, and that can generate data to send over the network and/or receive data from the network and act upon the received data.

Thus, a client may for example be the aforementioned personal computer-type device, a large-scale computer, a wireless computing device, a data source such as an audio, video, or text data source, a data server, a database server, a display monitor, an audio-producing device, or the like. In addition, the client may be a monitoring device such as a temperature, pressure, or volume monitoring device or the like; a control device such as a thermostat, a switch, a rheostat, or the like; an operational device such as a home dishwasher, an electronic lock, a door opener, an industrial oven, or the like; or any other appropriate device without departing from the spirit and scope of the present invention.

In general, and once again, in all cases, the client is provided with the functionality necessary to communicate over the network, and to generate data to send over the network and/or receive data from the network and act upon the received data. Here, providing the aforementioned functionality and generating/receiving/acting upon data is known or should be apparent to the relevant public and therefore need not be discussed herein in any detail.

Figure 16:
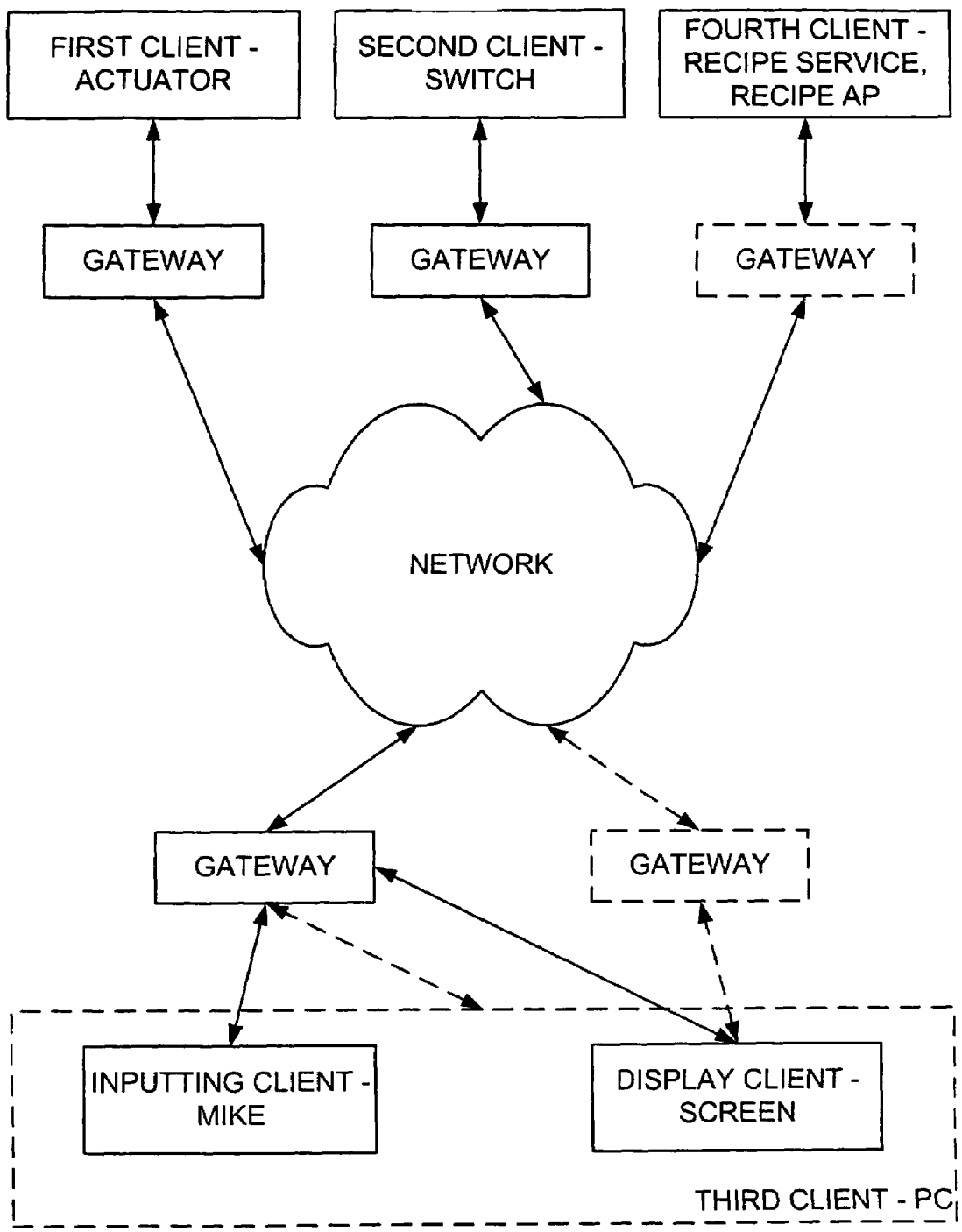
FIGS. 16 and 17 are network diagrams showing various clients coupled to the network of FIGS. 2 and 3 in accordance with embodiments of the present invention.

In but one example which is illustrative of the present invention, and referring now to FIG. 16, a user at a first client employs the network to turn on lights at a particular location, where the particular location may be close to the networked first client or far away from such first client. While the first client may be a personal computer-type computing device or the like, it is to be appreciated that the first client may also be another device. For example, such first client may be a networked actuator that is dedicated to controlling one or more of the lights or the like. Such networked actuator may for example be a hardware-based control panel. The first client, be it an actuator, a control panel, or otherwise is generally known or should be apparent to the relevant public and therefore need not be discussed herein in any detail. Thus, the manner and equipment employed to make the first client a client on the network may be any particular manner and equipment without departing from the spirit and scope of the present invention.

In the present example, the lights are coupled to a switch that is a second client on the network. As with the first client, the second client be it a switch or otherwise is generally known or should be apparent to the relevant public and therefore need not be discussed herein in any detail. Thus, and again, the manner and equipment employed to make the switch a client on the network may be any particular manner and equipment without departing from the spirit and scope of the present invention. As should be appreciated, the first and second clients may be in the same general location or may be separated by large distances, breadth of the network permitting.

In one embodiment of the present invention, each of the first and second clients is coupled to the network by being coupled to a local gateway which is in turn coupled to a local LDC. Alternatively, each client is coupled to the network by being coupled to a gateway at a local LDC. In one arrangement that may be employed, the gateway and each client coupled to the gateway support plug-and-play compatibility such that the mere act of plugging the client in causes the gateway to find and recognize the client. An example of a plug-and-play compatibility architecture is the Universal Plug and Play (UPnP) architecture for pervasive peer-to-peer network connectivity of PCs of all form factors, intelligent appliances, wireless devices, and the like. Of course, other architectures may be employed without departing from the spirit and scope of the present invention.

Generally, in the UPnP architecture, the gateway is coupled to one or more local wired or wireless systems at each location (e.g., the local telephone, cable, and/or power television wires in a house), and each client includes a microprocessor or the like and functionality for communicating with the gateway over such one or more systems. Accordingly, plugging a client into such one or more systems allows the gateway to automatically sense and communicate with the client such that the client is 'registered' to the gateway and can be found by other clients on the network by way of the gateway.

Importantly, as part of sensing and registering the client, the client preferably identifies its capabilities to the gateway, and perhaps other data including physical location data and the like. Accordingly, the gateway may supply this information to other clients on the network that require such information. It is to be noted that in the case where the gateway is at a local LDC, it may be necessary to include a sensing/registration module or the like at the house or the like for purposes of initially sensing the client and registering the client to the network.

To continue the example, with the first 'control' client and the second 'switch' client both registered to respective gateways and thus the network, the first client when actuated sends a message over the network to the second client to control the associated lights (e.g., to turn the lights on or off or to dim the lights a specific amount). To do so, the first client must know the network address of the second client. Methods of acquiring such address are known or should be apparent to the relevant public and therefore need not be described in detail. Generally, any appropriate method of acquiring such address may be employed without departing from the spirit and scope of the present invention.

In another example which is illustrative of the present invention, and still referring to FIG. 16, a user at a third client coupled to the network by way of the gateway subscribes to a recipe service at a fourth client for reviewing and selecting recipes. Here, it is seen that the fourth client providing the recipe service is coupled to an RDC of the network such that the fourth client can quickly dispatch the recipe service to many network subscribers at LDCs of the coupled-to RDC and at other LDCs. Of course, the fourth client may couple to the network at other locations without departing from the spirit and scope of the present invention.

In this example, the third client knows the address of the fourth client and requests a recipe from the fourth client. In addition, or in the alternative, the fourth client knows the address of the third client and without prompting sends a recipe to the third client, perhaps at a pre-selected time of day and/or of a pre-selected type. In one embodiment, the third client is a personal computer-type device that can both request the recipe and display the requested/sent recipe. In another embodiment, the third client is in fact two clients—an inputting client such as a microphone or mouse for inputting the request and a display client such as a display screen for displaying the recipe. In such case, the display client need not necessarily be physically close to the inputting client. Thus, the inputting device may be in a study, the display client may be in a kitchen, and a portion of the request may be to display the recipe on the display client in the kitchen. Notably, the inputting and display clients can be coupled to the same gateway or to different gateways. Moreover, the request may be made to an inputting device at a first location and may be to display the recipe on a display client at a second location relatively far from the first location, perhaps coupled to a different LDC and even a different RDC.

To continue the example, a user at the display device may decide to make the recipe, which includes heating an oven. As may now be appreciated, the oven, which may be located relatively close to or relatively far from the display client, is coupled to the network by way of an oven client and a gateway which may or may not be the gateway of the display client. Importantly, upon entering a command by way of the network to the recipe service at the fourth client to do so via an inputting client which may or may not be the previously mentioned inputting client, such recipe service at the fourth device by way of the network causes the oven client to turn on to a temperature selected by the fourth device, and perhaps causes the oven client to cook food placed in the heated oven for a pre-determined amount of time. Further upon expiration of the time, the fourth client may cause the oven client to turn the oven off, and may display to the user at a display device which may or may not be the previously mentioned display device that the food is finished cooking in the oven.

As may be seen, then, such fourth client may include one or more applications that through the network can direct/control other clients on the network. Presumably, most network-based activities are directed/controlled by an application residing on the network or on a client attached to the network, where the application receives inputs, performs logic, accesses data, issues outputs, etc. Nevertheless, there may be situations where the network-based activity is simple enough (the light-switch example above) wherein an application is not necessary, but instead wherein a mere routine running on a client processor can be employed to effectuate the activity. Such routine may for example simply issue a network command to another client on the network. In the context of the present invention, then, the terms 'application' and 'routine' are interchangeable.

Figure 17:
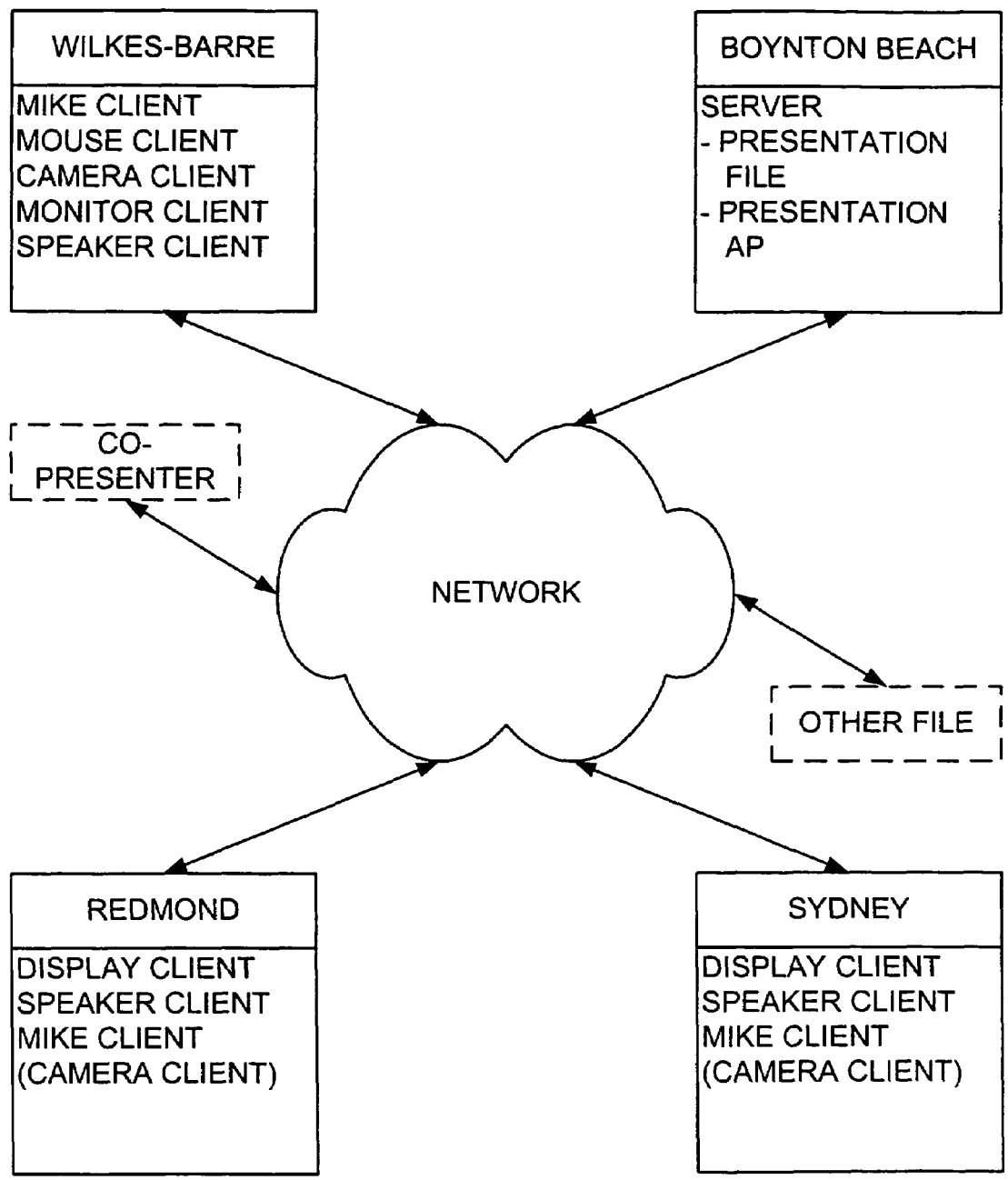

In a final example which is illustrative of the present invention, and now referring to FIG. 17, a user at one network location, for example in Wilkes-Barre, Pa., is in his home and has a first input client which in this case is a microphone, a second input client which in this case is a computer-type mouse, a third input client which in this case is a video-type camera, a display client which in this case is a computer-type monitor, and an output client which in this case is a speaker, all of which are appropriately coupled to the network by way of a gateway (not shown in FIG. 17). Here, the user has an office at another network location, for example in Boynton Beach, Fla., at which a server having a presentation file and a presentation application resides, where the server is appropriately coupled to the network by way of a gateway or by way of another type of network connection (not shown in FIG. 17). Here, too, a group of people have assembled at a conference room at another network location, for example in Redmond, Wash., and another group of people have assembled at a hotel suite at yet another network location, for example in Sydney, Australia. At each of the Redmond and Sydney locations resides a display client such as a projection screen for projecting computer-type display images resides, an output client such as a speaker system, and an input client such as one or more microphones, each such client is appropriately coupled to the network by way of a gateway or by way of another type of network connection (not shown in FIG. 17).

As may now be appreciated, the user in Wilkes-Barre may employ the network to access the presentation file and presentation application on the server in Boynton Beach to make a presentation and display the presentation to the groups of people in Redmond and Sydney. In making the presentation, the user in Wilkes-Barre can employ the mouse to control the presentation, the microphone and video camera to speak and show himself speaking during the presentation, and the monitor to view the presentation and/or himself. At Redmond and Sydney, the projection screen displays the presentation and/or the user in Wilkes-Barre, the speaker system produces sound as received from the presentation and/or the user in Wilkes-Barre, and the microphones are available to transmit comments and questions from the groups of people to the user in Wilkes-Barre and between the Redmond and Sydney locations. Of course, the speaker in Wilkes-Barre produces sounds as received from Redmond and/or Sydney.

Numerous variations and permutations of the present example are of course conceivable. To name but a few, the user in Wilkes-Barre may also access additional files at servers at other network locations, a co-presenter having access to appropriate clients may join in from another location, and the Redmond and Sydney locations may have video-type camera clients for transmitting video to the user in Wilkes-Barre and/or the co-presenter. Any such variation or permutation is considered to be within the spirit and scope of the present invention.

Note that the presentation application on the server in Boynton Beach may be employed to control all aspects of the network event as described in the present example. It may also be the case that multiple applications are employed to control different aspects of the network event. If so, it may be the case that the applications reside at the Wilkes-Barre, Boynton Beach, Redmond, and/or Sydney locations, or at other network locations. Any application at any network location may be employed without departing from the spirit and scope of the present invention.

In the network-based computing environment of the present invention, each application operates in pertinent part by determining what clients are available at a location. With knowledge of the available clients at the location, and as should be appreciated, the application knows what to output to the clients at the location and also what to input from the clients at the location. As was disclosed above, each application can determine what clients are available at a location by querying the associated gateway or the like for a list of registered clients and their capabilities and perhaps locations. Generally, methods and apparatus for determining what clients are available at a location are known or should be apparent to the relevant public and therefore need not be described herein in any detail. Thus, any appropriate methods and apparatus for determining what clients are available at a location may be employed without departing from the spirit and scope of the present invention.

Figure 18:
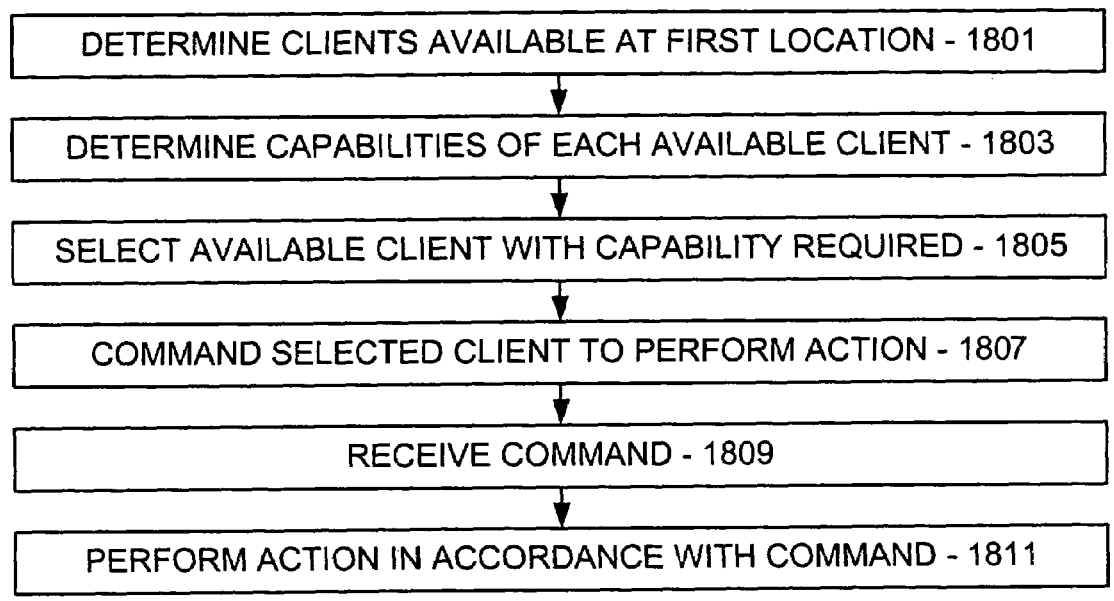
FIG. 18 is a block flow diagram showing steps performed in connection with the clients of FIGS. 16 and 17 in accordance with one embodiment of the present invention.

In general, then, the network of the present invention is employed to implement an action at a first network location by way of an application at a second network location. As seen in FIG. 18, to implement the action, the application determines over the network what clients are available at the first location (step 1801), and what capabilities each available client at the first location has (step 1803). The application then selects an available client at the first location, where the selected client has a capability required for the action to be implemented at the first location (step 1805). Thereafter, the application issues a command over the network to the selected client to perform at least a portion of the action (step 1807), the client receives the issued command over the network from the application (step 1809), and the selected client performs at least a portion of the action in accordance with the received command (step 1811).

Of course, for an application or a client to access the network, the application or the client must employ appropriate network access protocols. As above, methods and apparatus for accessing the network by each application or client are known or should be apparent to the relevant public and therefore need not be described herein in any detail. Thus, any appropriate methods and apparatus for accessing the network may be employed without departing from the spirit and scope of the present invention.

Note that access by applications to clients across a network must necessarily be restricted in view of security concerns. Accordingly, appropriate network security protocols are to be employed to ensure that access to a client by an application is permitted. As above, methods and apparatus for applying appropriate security protocols are known or should be apparent to the relevant public and therefore need not be described herein in any detail. Thus, any appropriate methods and apparatus for applying appropriate security protocols may be employed without departing from the spirit and scope of the present invention.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful network and method wherein the network performs most tasks necessary to distribute and update software on a computing device, to back up data on the computing device, to make available data and software on the computing device, and to interconnect network clients across the network, all in a manner that is substantially transparent to a user of the computing device. Accordingly, such user need not be computer savvy or literate except perhaps to answer simple questions, and the user can take advantage of network resources across the network. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for updating network services for a user coupled to a network, the network for providing network services to users and comprising:
   a centralized data center (CDC); and
   a plurality of regional data centers (RDCs) operatively coupled to the CDC, each RDC being operatively coupled to a plurality of users by way of a communications network, each RDC maintaining for each associated user a user profile listing services the user is subscribed to,
   the method comprising:
   contacting the RDC;
   requesting from the RDC a list of servers obtained from the user profile stored in the RDC to use for services provided by the network for the user, wherein the list of servers comprises a list of corresponding network addresses for the services provided by the network for the user based on the user profile;
   receiving the list of servers;
   displaying corresponding service icons on an associated user display for the received list of servers;

the user selecting a displayed icon;
contacting the RDC to determine whether a service corresponding to the selected displayed icon as installed on an associated user machine needs to be updated; and
if so,
downloading an update for the service; and
installing the update on the user machine.

2. The method of claim 1 comprising, upon receiving the list of servers, employing such list to connect to appropriate servers for network services subscribed to by the user.

3. The method of claim 1, wherein the network further comprises a plurality of local data centers (LDCs), each LDC being associated with a particular RDC and being operatively coupled to such particular RDC, each LDC being operatively coupled to a plurality of users by way of a broad-band communications network such that each user is associated with the particular RDC of the LDC, wherein each LDC includes services/data downloadable to associated users therefrom, the method comprising the further step of receiving an update for the service from the LDC associated with the RDC.

4. The method of claim 1, wherein the user connects to the network by:
receiving a network address of the CDC;
contacting the CDC at the network address thereof;
requesting from the CDC a network address of an RDC based at least in part on the location of the user; and
receiving a network address of an RDC from the CDC, the location of the RDC of the received network address expected to be relatively close to the location of the user as compared with the location of all other RDCs, the RDC of the received network address maintaining the user profile for the user.

5. A computer-executable medium having computer-readable instructions thereon that when processed by a processor implement a method for updating network services for a user coupled to a network, the network for providing network services to users and comprising:
a centralized data center (CDC); and
a plurality of regional data centers (RDCs) operatively coupled to the CDC, each RDC being operatively coupled to a plurality of users by way of a communications network, each RDC maintaining for each associated user a user profile listing services the user is subscribed to;
the instructions comprising modules including:
a first module for contacting the RDC;
a second module for requesting from the RDC a list of servers obtained from the user profile stored in the RDC to use for services provided by the network for the user, wherein the list of servers comprises a list of corresponding network addresses for the services provided by the network for the user based on the user profile;
a third module for receiving the list of servers;
a fourth module for, upon receiving the list of servers, displaying corresponding service icons for the received list of servers on an associated user display,
upon the user selecting a displayed icon, a fifth module for contacting the RDC to determine whether a service corresponding to the selected displayed icon as installed on an associated user machine needs to be updated;
a sixth module for downloading an update for the service if the service corresponding to the selected displayed icon as installed on an associated user machine needs to be updated; and
a seventh module for installing the update on the user machine.

6. The medium of claim 5 comprising an eighth module for, upon receiving the list of servers, employing such list to connect to appropriate servers for network services subscribed to by the user.

7. The medium of claim 5 wherein the network further comprises a plurality of local data centers (LDCs), each LDC being associated with a particular RDC and being operatively coupled to such particular RDC, each LDC being operatively coupled to a plurality of users by way of a broad-band communications network such that each user is associated with the particular RDC of the LDC, wherein each LDC includes services/data downloadable to associated users therefrom, the medium further comprising an eighth module that receives an update for the service from the LDC associated with the RDC.

8. The medium of claim 5, further comprising an eighth module that connects the user to the network by:
receiving a network address of the CDC;
contacting the CDC at the network address thereof;
requesting from the CDC a network address of an RDC based at least in part on the location of the user; and
receiving a network address of an RDC from the CDC, the location of the RDC of the received network address expected to be relatively close to the location of the user as compared with the location of all other RDCs, the RDC of the received network address maintaining the user profile for the user.

9. A computer having computer-readable instructions thereon for implementing a method for updating network services for a user coupled to a network, the network for providing network services to users and comprising:
a centralized data center (CDC); and
a plurality of regional data centers (RDCs) operatively coupled to the CDC, each RDC being operatively coupled to a plurality of users by way of a communications network, each RDC maintaining for each associated user a user profile listing services the user is subscribed to;
the instructions comprising modules including:
a first module contacting the RDC;
a second module requesting from the RDC a list of servers obtained from the user profile stored in the RDC to use for services provided by the network for the user, wherein the list of servers comprises a list of corresponding network addresses for the services provided by the network for the user based on the user profile;
a third module receiving the list of servers;
a fourth module for, upon receiving the list of servers, displaying corresponding service icons for the received list of servers on an associated user display,
upon the user selecting a displayed icon, a fifth module for contacting the RDC to determine whether a service corresponding to the selected displayed icon as installed on an associated user machine needs to be updated;
a sixth module downloading an update for the service if the service corresponding to the selected displayed icon as installed on an associated user machine needs to be updated; and
a seventh module installing the update on the user machine.

10. The computer of claim 9 comprising an eighth module, upon receiving the list of servers, employing such list to connect to appropriate servers for network services subscribed to by the user.

11. The computer of claim 9 wherein the network further comprises a plurality of local data centers (LDCs), each LDC being associated with a particular RDC and being operatively coupled to such particular RDC, each LDC being operatively coupled to a plurality of users by way of a broad-band communications network such that each user is associated with the particular RDC of the LDC, wherein each LDC includes services/data downloadable to associated users therefrom, the computer further comprising an eighth module that receives an update for the service from the LDC associated with the RDC.

12. The computer of claim 9, further comprising an eighth module that connects the user to the network by:
receiving a network address of the CDC;
contacting the CDC at the network address thereof requesting from the CDC a network address of an RDC based at least in part on the location of the user; and
receiving a network address of an RDC from the CDC, the location of the RDC of the received network address expected to be relatively close to the location of the user as compared with the location of all other RDCs, the RDC of the received network address maintaining the user profile for the user.

* * * * *

UNITED STATES PATENT AND TRADEMARK OFFICE
CERTIFICATE OF CORRECTION

| | |
|---|---|
| PATENT NO. | : 7,523,172 B2 |
| APPLICATION NO. | : 11/186258 |
| DATED | : April 21, 2009 |
| INVENTOR(S) | : Joseph H. Mouhanna et al. |

Page 1 of 1

It is certified that error appears in the above-identified patent and that said Letters Patent is hereby corrected as shown below:

In column 35, line 10, in Claim 12, delete "thereof" and insert -- thereof; --, therefor.

Signed and Sealed this
Third Day of May, 2011

David J. Kappos
*Director of the United States Patent and Trademark Office*